United States Patent
Zhang et al.

(10) Patent No.: US 12,432,681 B2
(45) Date of Patent: Sep. 30, 2025

(54) POSITIONING METHOD AND APPARATUS

(71) Applicant: HUAWEI TECHNOLOGIES CO., LTD., Guangdong (CN)

(72) Inventors: Yi Zhang, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 546 days.

(21) Appl. No.: 17/886,232

(22) Filed: Aug. 11, 2022

(65) Prior Publication Data
US 2022/0386267 A1    Dec. 1, 2022

Related U.S. Application Data

(63) Continuation of application No. PCT/CN2020/075155, filed on Feb. 13, 2020.

(51) Int. Cl.
*H04W 64/00* (2009.01)
*H04L 5/00* (2006.01)
*H04W 24/10* (2009.01)

(52) U.S. Cl.
CPC ........... *H04W 64/00* (2013.01); *H04L 5/0005* (2013.01); *H04W 24/10* (2013.01)

(58) Field of Classification Search
CPC ...... H04W 64/00; H04W 24/10; H04L 5/0005
See application file for complete search history.

(56) References Cited

U.S. PATENT DOCUMENTS

| | | | |
|---|---|---|---|
| 2019/0274113 | A1 | 9/2019 | Jiang et al. |
| 2021/0212033 | A1* | 7/2021 | Islam .................. H04L 1/0026 |

FOREIGN PATENT DOCUMENTS

| | | |
|---|---|---|
| CN | 105589506 A | 5/2016 |
| CN | 108093360 A | 5/2018 |
| CN | 109640269 A | 4/2019 |
| CN | 110366112 A | 10/2019 |
| WO | 2015026287 A2 | 2/2015 |

OTHER PUBLICATIONS

U.S. Appl. No. 62/915,551, filed Oct. 15, 2019, Manolakos et al.*

(Continued)

*Primary Examiner* — Wayne H Cai
(74) *Attorney, Agent, or Firm* — Fish & Richardson P.C.

(57) ABSTRACT

This application provides example positioning methods and example apparatuses. One example method includes sending, by a positioning management network element, a positioning measurement request to a positioning measurement network element. The positioning measurement request is used to request the positioning measurement network element to feed back channel state information of a terminal device. Then, the positioning management network element receives a positioning measurement response from the positioning measurement network element. The positioning measurement response includes the channel state information of the terminal device. Then, the positioning management network element determines a location of the terminal device based on the channel state information of the terminal device.

22 Claims, 5 Drawing Sheets

(56) References Cited

OTHER PUBLICATIONS

3GPP TS 36.305 V15.4.0 (Jun. 2019), "3rd Generation Partnership Project; Technical Specification Group Radio Access Network; Evolved Universal Terrestrial Radio Access Network (E-UTRAN); Stage 2 Functional Specification of User Equipment (UE) Positioning in E-UTRAN (Release 15)," Jun. 2019, 91 pages.
3GPP TS 36.355 V15.5.0 (Sep. 2019), "3rd Generation Partnership Project; Technical Specification Group Radio Access Network; Evolved Universal Terrestrial Radio Access (E-UTRA); LTE Positioning Protocol (LPP) (Release 15)," Sep. 2019, 224 pages.
3GPP TS 38.305 V15.4.0 (Jun. 2019), "3rd Generation Partnership Project; Technical Specification Group Radio Access Network; NG Radio Access Network (NG-RAN); Stage 2 Functional Specification of User Equipment (UE) Positioning in NG-RAN (Release 15)," Jun. 2019, 72 pages.
3GPP TS 38.455 V15.2.1 (Jan. 2019), "3rd Generation Partnership Project; Technical Specification Group Radio Access Network; NG-RAN; NR Positioning Protocol A (NRPPa) (Release 15)," Jan. 2019, 60 pages.
PCT International Search Report and Written Opinion issued in International Application No. PCT/CN2020/075155 on Nov. 18, 2020, 17 pages (with English translation).
Qualcomm Incorporated, "DL and UL NR Positioning Procedures," 3GPP TSG-RAN WG2 Meeting #106 R2-1906779, Reno, Nevada, USA, May 13-17, 2019, 8 pages.
Extended European Search Report in European ApplN No. 20918957.0, dated Oct. 10, 2022, 8 pages.

\* cited by examiner

POSITIONING METHOD AND APPARATUS

CROSS-REFERENCE TO RELATED APPLICATIONS

This application is a continuation of International Application No. PCT/CN2020/075155, filed on Feb. 13, 2020, the disclosure of which is hereby incorporated by reference in its entirety.

TECHNICAL FIELD

This application relates to the communication field, and in particular, to a positioning method and apparatus.

BACKGROUND

A wireless positioning technology has been determined as an important research project in a 5th generation (5th generation, 5G) mobile communication technology of the 3rd Generation Partnership Project (3rd generation partnership project, 3GPP). Application scenarios include autonomous driving, smart driving, an internet of vehicles, an industrial internet of things (industrial internet of things, IIoT), and the like. The industrial internet of things is usually a closed wireless communication environment, and propagation paths of a radio signal are complex, for example, a plurality of times of reflection, refraction, and scattering. That is, there is a severe multi-path (multi-path) propagation phenomenon.

In currently commonly used wireless positioning algorithms, such as an observed time difference of arrival (observed time difference of arrival, OTDOA) algorithm and an uplink angle-of-arrival (uplink angle-of-arrival, UAOA) algorithm, positioning is performed based on time of arrival and/or an angle of arrival of the radio signal. However, in the IIoT application scenario, detected time of arrival and a detected angle of arrival are inaccurate due to the severe multi-path phenomenon. Consequently, positioning accuracy is poor, and a positioning accuracy requirement in a multi-path multi-transmission scenario such as the IIoT cannot be satisfied.

SUMMARY

Embodiments of this application provide a positioning method and apparatus, to resolve a problem that a positioning result of a terminal device is inaccurate due to multi-path propagation, so that positioning accuracy is improved.

To achieve the foregoing objective, the following technical solutions are used in this application.

According to a first aspect, a positioning method is provided. The positioning method includes: A positioning management network element sends a positioning measurement request to a positioning measurement network element. The positioning measurement request is used to request the positioning measurement network element to feed back channel state information of a terminal device. Then, the positioning management network element receives a positioning measurement response from the positioning measurement network element. The positioning measurement response includes the channel state information of the terminal device. Then, the positioning management network element determines a location of the terminal device based on the channel state information of the terminal device.

Based on the positioning method in the first aspect, the positioning management network element may determine the location of the terminal device based on the channel state information of the terminal device. Therefore, in a closed wireless communication environment such as an industrial internet of things, time of arrival and an angle of arrival of a detected radio signal are inaccurate due to a severe multi-path propagation phenomenon. Consequently, a positioning result of the terminal device is inaccurate. Positioning accuracy of the terminal device can be improved.

In a possible design solution, the channel state information of the terminal device may be distinguished in time domain or frequency domain. To be specific, the channel state information of the terminal device may include time domain channel state information or frequency domain channel state information. The positioning measurement request may include one or more of the following information: reference signal configuration information, domain configuration information, antenna port pair configuration information, time domain information, or frequency domain information. The reference signal configuration information is used to indicate configuration information of a reference signal used during channel state measurement. The domain configuration information is used to indicate to report the time domain channel state information or the frequency domain channel state information. The antenna port pair configuration information is used to indicate an antenna port pair whose channel state needs to be reported. The time domain information is used to indicate a time domain parameter used during channel state measurement. The frequency domain information is used to indicate a frequency domain parameter used during channel state measurement. The functions of the time domain channel state information and the frequency domain channel state information in the process of positioning the terminal device are equivalent. Therefore, the positioning management network element may select one mode to indicate the positioning measurement network element to measure and report the time domain channel state information or the frequency domain channel state information, to reduce measurement workload and reported data amount of the positioning measurement network element, so that positioning efficiency is improved.

Optionally, the time domain information may include one or more of the following information: a total quantity of paths to be reported, a path power threshold, or a path amplitude threshold. In this way, workload of measuring the time domain channel state information by the positioning measurement network element may be further reduced, thereby further improving the positioning efficiency.

Optionally, the frequency domain information may include one or more of the following information: a frequency-domain range to be reported, a subcarrier spacing, or a radio bearer RB spacing. In this way, workload of measuring the frequency domain channel state information by the positioning measurement network element may be further reduced, thereby further improving the positioning efficiency.

Corresponding to the positioning measurement request, the positioning measurement response may include one or more of the following information: domain indication information, antenna port pair indication information, the time domain channel state information, or the frequency domain channel state information. The domain indication information is used to indicate that the channel state information of the terminal device is the time domain channel state information or the frequency domain channel state information.

The antenna port pair indication information is used to indicate an antenna port pair corresponding to the channel state information of the terminal device. The functions of the time domain channel state information and the frequency domain channel state information in the process of positioning the terminal device are equivalent. In this way, the positioning management network element may indicate the positioning measurement network element to select one mode to report the time domain channel state information or the frequency domain channel state information, to reduce data amount of channel state information to be reported by the positioning measurement network element, so that the positioning efficiency is improved.

Optionally, the time domain channel state information may include one or more of the following information: a total quantity of reported paths, a delay of each of the reported paths, amplitude of each of the reported paths, power of each of the reported paths, or a phase of each of the reported paths. In this way, data amount of the time domain channel state information to be reported by the positioning measurement network element may be further reduced, thereby further improving the positioning efficiency.

Optionally, the frequency domain channel state information may include one or more of the following information: a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs. In this way, data amount of the frequency domain channel state information to be reported by the positioning measurement network element may be further reduced, thereby further improving the positioning efficiency.

In another possible design solution, the channel state information of the terminal device may alternatively be distinguished based on a signal transmission direction. To be specific, the channel state information of the terminal device may include uplink channel state information UL-CSI of the terminal device and downlink channel state information DL-CSI of the terminal device. In this way, the positioning management network element may indicate the positioning measurement network element to select one mode to report the UL-CSI or the DL-CSI, to reduce data amount of channel state information to be reported by the positioning measurement network element, so that the positioning efficiency is improved.

It should be understood that the positioning management network element may receive the UL-CSI or the DL-CSI of the terminal device from different positioning measurement network elements. Details are described below.

Optionally, the positioning measurement network element may include a serving access network element of the terminal device and/or a neighbor access network element of the serving access network element. Correspondingly, the channel state information of the terminal device may include the UL-CSI of the terminal device, and the positioning measurement request is used to request the serving access network element of the terminal device and/or the neighbor access network element of the serving access network element to feed back the UL-CSI of the terminal device. In this way, the positioning management network element may indicate only the serving access network element of the terminal device and/or the neighbor access network element of the serving access network element to measure and report the UL-CSI of the terminal device, to reduce a quantity of positioning measurement network elements and measurement workload, so that the positioning efficiency is improved.

Optionally, the foregoing reference signal configuration information may include one or more of the following information: a time domain configuration, a frequency domain configuration, a port number, or beam information of a sounding reference signal SRS. In this way, the serving access network element of the terminal device and/or the neighbor access network element of the serving access network element may measure only UL-CSI of a terminal device corresponding to a configured SRS, to further reduce measurement workload of the positioning measurement network element, so that the positioning efficiency is further improved.

Optionally, the positioning measurement network element may alternatively be the terminal device, the channel state information of the terminal device may include the downlink channel state information DL-CSI of the terminal device, and the positioning measurement request is used to request the DL-CSI of the terminal device. In this way, the positioning management network element may indicate only the terminal device to measure the DL-CSI of the terminal device, to reduce a quantity of positioning measurement network elements and measurement workload, so that the positioning efficiency is improved.

Optionally, the positioning measurement request may be determined by the positioning management network element based on DL-CSI measurement capability information of the terminal device. In this way, the positioning management network element may determine, based on the DL-CSI measurement capability information of the terminal device, content of a measurement task of the terminal device and content of the DL-CSI reported by the terminal device, to avoid an invalid interaction procedure caused by delivery of a measurement task exceeding a DL-CSI measurement capability of the terminal device to the terminal device, so that the positioning efficiency is improved.

Further, before the positioning management network element sends the positioning measurement request to the positioning measurement network element, the positioning method in the first aspect may further include: The positioning management network element receives the DL-CSI measurement capability information of the terminal device. It should be understood that the positioning management network element may obtain the DL-CSI measurement capability information of the terminal device from the terminal device, the serving access network element, an access and mobility management function (access and mobility management function, AMF) network element, an operation, administration, and maintenance (operation, administration, and maintenance, OAM) network element, and the like. An implementation of obtaining the DL-CSI measurement capability information of the terminal device by the positioning management network element is not specifically limited in this application.

Optionally, the positioning measurement request may further include one or more of the following information: configuration information of the serving access network element of the terminal device or configuration information of the neighbor access network element of the serving access network element, for example, neighbor cell configuration information, base station identifiers, cell identifiers, or location information of the foregoing access network elements. Further, the terminal device may be positioned with reference to measurement results of downlink reference signals transmitted by the terminal device to a plurality of cells, to further improve the positioning accuracy.

Optionally, the reference signal configuration information may include configuration information of a downlink reference signal, and the downlink reference signal may be a positioning reference signal PRS or a channel state information reference signal CSI-RS. In this way, the terminal device may measure only DL-CSI of a terminal device corresponding to a configured PRS or CSI-RS, to further reduce measurement workload of the terminal device, so that the positioning efficiency is further improved.

In a possible design solution, that the positioning management network element determines a location of the terminal device based on the channel state information of the terminal device may include: The positioning management network element determines the location of the terminal device based on a correspondence between the channel state information of the terminal device and location information. For example, a one-to-one correspondence (which is referred to as a fingerprint database in this application) between a plurality of preset locations and a plurality of pieces of preset channel state information may be established. For example, the one-to-one correspondence may be recorded through actual measurement. Then, the location of the terminal device is determined based on a result of matching between the channel state information of the terminal device that is reported by the positioning measurement network element and the plurality of pieces of preset channel state information.

According to a second aspect, a positioning method is provided. The positioning method is applied to an access network element, for example, a serving access network element of a terminal device, and/or a neighbor access network element of the serving access network element. The method includes: The access network element receives a positioning measurement request from a positioning management network element. The positioning measurement request is used to request the access network element to feed back channel state information of a terminal device. Then, the access network element sends a positioning measurement response to a positioning management network element. The positioning measurement response includes the channel state information of the terminal device, and the channel state information of the terminal device is used by the positioning management network element to determine a location of the terminal device.

In a possible design solution, the channel state information of the terminal device may be distinguished in time domain or frequency domain. To be specific, the channel state information of the terminal device may include time domain channel state information or frequency domain channel state information. The positioning measurement request may include one or more of the following information: reference signal configuration information, domain configuration information, antenna port pair configuration information, time domain information, or frequency domain information. The reference signal configuration information is used to indicate configuration information of a reference signal used during channel state measurement. The domain configuration information is used to indicate to report the time domain channel state information or the frequency domain channel state information. The antenna port pair configuration information is used to indicate an antenna port pair whose channel state needs to be reported. The time domain information is used to indicate a time domain parameter used during channel state measurement. The frequency domain information is used to indicate a frequency domain parameter used during channel state measurement.

Optionally, the time domain information may include one or more of the following information: a total quantity of paths to be reported, a path power threshold, or a path amplitude threshold.

Optionally, the frequency domain information may include one or more of the following information: a frequency-domain range to be reported, a subcarrier spacing, or a radio bearer RB spacing.

Corresponding to the positioning measurement request, the positioning measurement response may include one or more of the following information: domain indication information, antenna port pair indication information, the time domain channel state information, or the frequency domain channel state information. The domain indication information is used to indicate that the channel state information of the terminal device is the time domain channel state information or the frequency domain channel state information. The antenna port pair indication information is used to indicate an antenna port pair corresponding to the channel state information of the terminal device.

Optionally, the time domain channel state information may include one or more of the following information: a total quantity of reported paths, a delay of each of the reported paths, amplitude of each of the reported paths, power of each of the reported paths, or a phase of each of the reported paths.

Optionally, the frequency domain channel state information may include one or more of the following information: a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs.

Optionally, the channel state information of the terminal device may include uplink channel state information UL-CSI of the terminal device, and the positioning measurement request is used to request the access network element to feed back the UL-CSI of the terminal device.

Optionally, the reference signal configuration information may include one or more of the following information: a time domain configuration, a frequency domain configuration, a port number, or beam information of a sounding reference signal SRS.

In addition, for technical effects of the positioning method in the second aspect, refer to the technical effects of the positioning method in the first aspect. Details are not described herein again.

According to a third aspect, a positioning method is provided. The positioning method is applied to a terminal device. The method includes: The terminal device receives a positioning measurement request from a positioning management network element. The positioning measurement request is used to request the terminal device to feed back channel state information of the terminal device. Then, the terminal device sends a positioning measurement response to the positioning management network element. The positioning measurement response includes the channel state information of the terminal device, and the channel state information of the terminal device is used by the positioning management network element to determine a location of the terminal device.

In a possible design solution, the channel state information of the terminal device may be distinguished in time domain or frequency domain. To be specific, the channel state information of the terminal device may include time domain channel state information or frequency domain channel state information. The positioning measurement request may include one or more of the following information: reference signal configuration information, domain configuration information, antenna port pair configuration information, time domain information, or frequency domain information. The reference signal configuration information is used to indicate configuration information of a reference signal used during channel state measurement. The domain configuration information is used to indicate to report the time domain channel state information or the frequency domain channel state information. The antenna port pair configuration information is used to indicate an antenna port pair whose channel state needs to be reported. The time domain information is used to indicate a time domain parameter used during channel state measurement. The frequency domain information is used to indicate a frequency domain parameter used during channel state measurement.

Optionally, the time domain information may include one or more of the following information: a total quantity of paths to be reported, a path power threshold, or a path amplitude threshold.

Optionally, the frequency domain information may include one or more of the following information: a frequency-domain range to be reported, a subcarrier spacing, or a radio bearer RB spacing.

Corresponding to the positioning measurement request, the positioning measurement response may include one or more of the following information: domain indication information, antenna port pair indication information, the time domain channel state information, or the frequency domain channel state information. The domain indication information is used to indicate that the channel state information of the terminal device is the time domain channel state information or the frequency domain channel state information. The antenna port pair indication information is used to indicate an antenna port pair corresponding to the channel state information of the terminal device.

Optionally, the time domain channel state information may include one or more of the following information: a total quantity of reported paths, a delay of each of the reported paths, amplitude of each of the reported paths, power of each of the reported paths, or a phase of each of the reported paths.

Optionally, the frequency domain channel state information may include one or more of the following information: a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs.

Optionally, the channel state information of the terminal device may include downlink channel state information DL-CSI of the terminal device, and the positioning measurement request is used to request the DL-CSI of the terminal device.

Optionally, the positioning measurement request may be determined by the positioning management network element based on DL-CSI measurement capability information of the terminal device.

Further, before the terminal device receives the positioning measurement request from the positioning management network element, the positioning method in the third aspect may further include: The terminal device sends the DL-CSI measurement capability information of the terminal device to the positioning management network element. The DL-CSI measurement capability information of the terminal device is used by the positioning management network element to determine the positioning measurement request.

Optionally, the positioning measurement request may further include one or more of the following information: configuration information of a serving access network element of the terminal device or configuration information of a neighbor access network element of the serving access network element, for example, neighbor cell configuration information, base station identifiers, cell identifiers, or location information of the foregoing access network elements.

Optionally, the reference signal configuration information may include configuration information of a downlink reference signal, and the downlink reference signal may be a positioning reference signal PRS or a channel state information reference signal CSI-RS.

In addition, for technical effects of the positioning method in the third aspect, refer to the technical effects of the positioning method in the first aspect. Details are not described herein again.

According to a fourth aspect, a positioning apparatus is provided. The positioning apparatus includes a processing module and a transceiver module. The transceiver module is configured to send a positioning measurement request to a positioning measurement network element. The positioning measurement request is used to request the positioning measurement network element to feed back channel state information of a terminal device. The transceiver module is further configured to receive a positioning measurement response from the positioning measurement network element. The positioning measurement response includes the channel state information of the terminal device. The processing module is configured to determine a location of the terminal device based on the channel state information of the terminal device.

In a possible design solution, the channel state information of the terminal device may be distinguished in time domain or frequency domain. To be specific, the channel state information of the terminal device may include time domain channel state information or frequency domain channel state information. The positioning measurement request may include one or more of the following information: reference signal configuration information, domain configuration information, antenna port pair configuration information, time domain information, or frequency domain information. The reference signal configuration information is used to indicate configuration information of a reference signal used during channel state measurement. The domain configuration information is used to indicate to report the time domain channel state information or the frequency domain channel state information. The antenna port pair configuration information is used to indicate an antenna port pair whose channel state needs to be reported. The time domain information is used to indicate a time domain parameter used during channel state measurement. The frequency domain information is used to indicate a frequency domain parameter used during channel state measurement.

Optionally, the time domain information may include one or more of the following information: a total quantity of paths to be reported, a path power threshold, or a path amplitude threshold.

Optionally, the frequency domain information may include one or more of the following information: a frequency-domain range to be reported, a subcarrier spacing, or a radio bearer RB spacing.

Corresponding to the positioning measurement request, the positioning measurement response may include one or more of the following information: domain indication information, antenna port pair indication information, the time domain channel state information, or the frequency domain channel state information. The domain indication information is used to indicate that the channel state information of the terminal device is the time domain channel state information or the frequency domain channel state information. The antenna port pair indication information is used to indicate an antenna port pair corresponding to the channel state information of the terminal device.

Optionally, the time domain channel state information may include one or more of the following information: a total quantity of reported paths, a delay of each of the reported paths, amplitude of each of the reported paths, power of each of the reported paths, or a phase of each of the reported paths.

Optionally, the frequency domain channel state information may include one or more of the following information: a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs.

In another possible design solution, the channel state information of the terminal device may alternatively be distinguished based on a signal transmission direction. To be specific, the channel state information of the terminal device may include uplink channel state information UL-CSI of the terminal device and downlink channel state information DL-CSI of the terminal device.

It should be understood that, in the fourth aspect, the positioning apparatus may receive the UL-CSI or the DL-CSI of the terminal device from different positioning measurement network elements. Details are described below.

Optionally, the positioning measurement network element may include a serving access network element of the terminal device and/or a neighbor access network element of the serving access network element. Correspondingly, the channel state information of the terminal device may include the UL-CSI of the terminal device, and the positioning measurement request is used to request the serving access network element of the terminal device and/or the neighbor access network element of the serving access network element to feed back the UL-CSI of the terminal device.

Optionally, the foregoing reference signal configuration information may include one or more of the following information: a time domain configuration, a frequency domain configuration, a port number, or beam information of a sounding reference signal SRS.

Optionally, the positioning measurement network element may alternatively be the terminal device, the channel state information of the terminal device may include the downlink channel state information DL-CSI of the terminal device, and the positioning measurement request is used to request the DL-CSI of the terminal device.

Optionally, the positioning measurement request may be determined by the positioning apparatus based on DL-CSI measurement capability information of the terminal device.

Further, the transceiver module is further configured to receive the DL-CSI measurement capability information of the terminal device before the transceiver module sends the positioning measurement request to the positioning measurement network element.

Optionally, the positioning measurement request may further include one or more of the following information: configuration information of a serving access network element of the terminal device or configuration information of a neighbor access network element of the serving access network element, for example, neighbor cell configuration information, base station identifiers, cell identifiers, or location information of the foregoing access network elements.

Optionally, the reference signal configuration information may include configuration information of a downlink reference signal, and the downlink reference signal may be a positioning reference signal PRS or a channel state information reference signal CSI-RS.

In a possible design solution, the processing module is further configured to determine a location of the terminal device based on a correspondence between the channel state information of the terminal device and location information.

Optionally, in the fourth aspect, the positioning apparatus may further include a storage module. The storage module stores a program or instructions. When the processing module executes the program or the instructions, the positioning apparatus in the fourth aspect is enabled to perform the positioning method in the first aspect.

It should be noted that, in the fourth aspect, the positioning apparatus may be a positioning management network element, for example, a location management function (location management function, LMF) network element, an evolved serving mobile location center (evolved serving mobile location center, E-SMLC), a positioning server, or a navigation server, or may be a chip (system) that may be disposed in the foregoing positioning management network element or another component that has a function of the positioning management network element. This is not limited in this application.

In addition, for technical effects of the positioning apparatus in the fourth aspect, refer to the technical effects of the positioning method in the first aspect. Details are not described herein again.

According to a fifth aspect, a positioning apparatus is provided. The positioning apparatus includes a receiving module and a sending module. The receiving module is configured to receive a positioning measurement request from a positioning management network element. The positioning measurement request is used to request the positioning apparatus to feed back channel state information of a terminal device. The sending module is configured to send a positioning measurement response to the positioning management network element. The positioning measurement response includes the channel state information of the terminal device, and the channel state information of the terminal device is used by the positioning management network element to determine a location of the terminal device.

In a possible design solution, the channel state information of the terminal device may be distinguished in time domain or frequency domain. To be specific, the channel state information of the terminal device may include time domain channel state information or frequency domain channel state information. The positioning measurement request may include one or more of the following information: reference signal configuration information, domain configuration information, antenna port pair configuration information, time domain information, or frequency domain information. The reference signal configuration information is used to indicate configuration information of a reference signal used during channel state measurement. The domain configuration information is used to indicate to report the time domain channel state information or the frequency domain channel state information. The antenna port pair configuration information is used to indicate an antenna port pair whose channel state needs to be reported. The time domain information is used to indicate a time domain parameter used during channel state measurement. The frequency domain information is used to indicate a frequency domain parameter used during channel state measurement.

Optionally, the time domain information may include one or more of the following information: a total quantity of paths to be reported, a path power threshold, or a path amplitude threshold.

Optionally, the frequency domain information may include one or more of the following information: a frequency-domain range to be reported, a subcarrier spacing, or a radio bearer RB spacing.

Corresponding to the positioning measurement request, the positioning measurement response may include one or more of the following information: domain indication information, antenna port pair indication information, the time domain channel state information, or the frequency domain channel state information. The domain indication information is used to indicate that the channel state information of the terminal device is the time domain channel state information or the frequency domain channel state information. The antenna port pair indication information is used to indicate an antenna port pair corresponding to the channel state information of the terminal device.

Optionally, the time domain channel state information may include one or more of the following information: a total quantity of reported paths, a delay of each of the reported paths, amplitude of each of the reported paths, power of each of the reported paths, or a phase of each of the reported paths.

Optionally, the frequency domain channel state information may include one or more of the following information: a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs.

Optionally, the channel state information of the terminal device may include uplink channel state information UL-CSI of the terminal device, and the positioning measurement request is used to request the positioning apparatus in the fifth aspect to feed back the UL-CSI of the terminal device.

Optionally, the reference signal configuration information may include one or more of the following information: a time domain configuration, a frequency domain configuration, a port number, or beam information of a sounding reference signal SRS.

Optionally, in the fifth aspect, the positioning apparatus may further include a processing module and a storage module. The storage module stores a program or instructions. When the processing module executes the program or the instructions, the positioning apparatus in the fifth aspect is enabled to perform the positioning method in the second aspect.

It should be noted that, in the fifth aspect, the positioning apparatus may be an access network element, for example, a serving access network element of the terminal device or a neighbor access network element of the serving access network element, or may be a chip (system) that may be disposed in the foregoing access network element or another component that has a function of the access network element. This is not limited in this application.

In addition, for technical effects of the positioning apparatus in the fifth aspect, refer to the technical effects of the positioning method in the first aspect. Details are not described herein again.

According to a sixth aspect, a positioning apparatus is provided. The positioning apparatus includes a receiving module and a sending module. The receiving module is configured to receive a positioning measurement request from a positioning management network element. The positioning measurement request is used to request the positioning apparatus to feed back channel state information of the positioning apparatus. The sending module is configured to send a positioning measurement response to the positioning management network element. The positioning measurement response includes the channel state information of the positioning apparatus, and the channel state information of the positioning apparatus is used by the positioning management network element to determine a location of the positioning apparatus.

In a possible design solution, the channel state information of the positioning apparatus in the sixth aspect may be distinguished in time domain or frequency domain. To be specific, the channel state information of the positioning apparatus in the sixth aspect may include time domain channel state information or frequency domain channel state information. The positioning measurement request may include one or more of the following information: reference signal configuration information, domain configuration information, antenna port pair configuration information, time domain information, or frequency domain information. The reference signal configuration information is used to indicate configuration information of a reference signal used during channel state measurement. The domain configuration information is used to indicate to report the time domain channel state information or the frequency domain channel state information. The antenna port pair configuration information is used to indicate an antenna port pair whose channel state needs to be reported. The time domain information is used to indicate a time domain parameter used during channel state measurement. The frequency domain information is used to indicate a frequency domain parameter used during channel state measurement.

Optionally, the time domain information may include one or more of the following information: a total quantity of paths to be reported, a path power threshold, or a path amplitude threshold.

Optionally, the frequency domain information may include one or more of the following information: a frequency-domain range to be reported, a subcarrier spacing, or a radio bearer RB spacing.

Corresponding to the positioning measurement request, the positioning measurement response may include one or more of the following information: domain indication information, antenna port pair indication information, the time domain channel state information, or the frequency domain channel state information. The domain indication information is used to indicate that the channel state information of the positioning apparatus in the sixth aspect is the time domain channel state information or the frequency domain channel state information. The antenna port pair indication information is used to indicate an antenna port pair corresponding to the channel state information of the positioning apparatus in the sixth aspect.

Optionally, the time domain channel state information may include one or more of the following information: a total quantity of reported paths, a delay of each of the reported paths, amplitude of each of the reported paths, power of each of the reported paths, or a phase of each of the reported paths.

Optionally, the frequency domain channel state information may include one or more of the following information: a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs.

Optionally, the channel state information of the positioning apparatus in the sixth aspect may include downlink channel state information DL-CSI of the positioning apparatus in the sixth aspect, and the positioning measurement request is used to request the DL-CSI of the positioning apparatus in the sixth aspect.

Optionally, the positioning measurement request may be determined by the positioning management network element based on DL-CSI measurement capability information of the positioning apparatus in the sixth aspect.

Further, the sending module is further configured to: before the receiving module receives the positioning measurement request from the positioning management network element, send the DL-CSI measurement capability information of the positioning apparatus in the sixth aspect to the positioning management network element. The DL-CSI measurement capability information of the positioning apparatus in the sixth aspect is used by the positioning management network element to determine the positioning measurement request.

Optionally, the positioning measurement request may further include one or more of the following information: configuration information of a serving access network element of the positioning apparatus in the sixth aspect or configuration information of a neighbor access network element of the serving access network element, for example, neighbor cell configuration information, base station identifiers, cell identifiers, or location information of the foregoing access network elements.

Optionally, the reference signal configuration information may include configuration information of a downlink reference signal, and the downlink reference signal may be a positioning reference signal PRS or a channel state information reference signal CSI-RS.

Optionally, in the sixth aspect, the positioning apparatus may further include a processing module and a storage module. The storage module stores a program or instructions. When the processing module executes the program or the instructions, the positioning apparatus in the sixth aspect is enabled to perform the positioning method in the third aspect.

It should be noted that, in the sixth aspect, the positioning apparatus may be a terminal device, for example, a mobile phone, or may be a chip (system) that may be disposed in the foregoing terminal device or another component that has a function of the terminal device. This is not limited in this application.

In addition, for technical effects of the positioning apparatus in the sixth aspect, refer to the technical effects of the positioning method in the first aspect. Details are not described herein again.

According to a seventh aspect, a positioning apparatus is provided. The positioning apparatus includes a processor. The processor is coupled to a memory. The memory is configured to store a computer program. The processor is configured to execute the computer program stored in the memory, so that the positioning apparatus performs the positioning method according to any one of the possible implementations of the first aspect to the third aspect.

In a possible design, the positioning apparatus in the seventh aspect may further include a transceiver. The transceiver may be a transceiver circuit or an input/output interface. The transceiver may be used by the positioning apparatus to communicate with another positioning apparatus.

In this application, in the seventh aspect, the positioning apparatus may be a positioning management network element, for example, an LMF network element, an E-SMLC, a positioning server, or a navigation server; may be a positioning measurement network element, for example, a terminal device or an access network element; may be a chip (system) that may be disposed in the positioning management network element or another component that has a function of the positioning management network element; or may be a chip (system) that may be disposed in the positioning measurement network element or another component that has a function of the positioning measurement network element.

For technical effects of the positioning apparatus in the seventh aspect, refer to the technical effects of the positioning method according to any one of the implementations of the first aspect to the third aspect. Details are not described herein again.

According to an eighth aspect, a chip system is provided. The chip system includes a processor and an input/output port. The processor is configured to implement a processing function in the first aspect to the third aspect, and the input/output port is configured to implement a transceiver function in the first aspect to the third aspect.

In a possible design, the chip system further includes a memory. The memory is configured to store program instructions and data for implementing a function in the first aspect to the third aspect.

The chip system may include a chip, or may include the chip and another discrete component.

According to a ninth aspect, a communication system that can be configured to locate a terminal device is provided. The communication system includes a to-be-positioned terminal device, a positioning management network element, and a positioning measurement network element. The positioning management network element may be an LMF network element, an E-SMLC, a positioning server, a navigation server, or the like. The positioning measurement network element may include the terminal device, an access network element, or the like. The access network element may include a serving access network element of the terminal device, for example, an SgNB, and/or a neighbor access network element of the serving access network element, for example, an NgNB. For examples of the terminal device and each access network element, refer to the following embodiments of the communication system. Details are not described herein again.

According to a tenth aspect, a computer-readable storage medium is provided. The computer-readable storage medium includes a computer program or instructions. When the computer program or the instructions are run on a computer, the computer is enabled to perform the positioning method according to any one of the possible implementations of the first aspect to the third aspect.

According to an eleventh aspect, a computer program product is provided. The computer program product includes a computer program or instructions. When the computer program or the instructions are run on a computer, the computer is enabled to perform the positioning method according to any one of the possible implementations of the first aspect to the third aspect.

DESCRIPTION OF EMBODIMENTS

Figure 1:
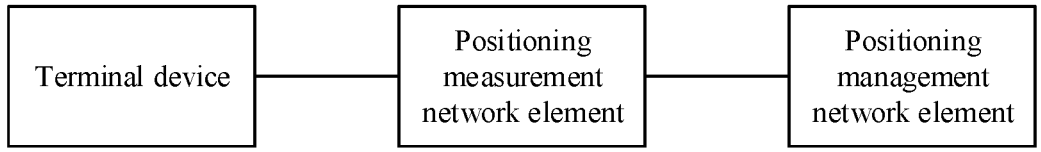
FIG. 1 is a schematic diagram 1 of an architecture of a communication system according to an embodiment of this application.

The following describes technical solutions of this application with reference to the accompanying drawings.

The technical solutions in embodiments of this application may be applied to various communication systems that can be configured to locate a terminal device, for example, an industrial internet of things IIoT system, a vehicle to everything (vehicle to everything, V2X) communication system, a device-to-device (device-to-device, D2D) communication system, an internet of vehicles communication system, a 4th generation (4th generation, 4G) mobile communication system such as a long term evolution (long term evolution, LTE) system or a worldwide interoperability for microwave access (worldwide interoperability for microwave access, WiMAX) communication system, a 5th generation (5th generation, 5G) mobile communication system such as a new radio (NR) system, or a future communication system such as a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

In addition, in embodiments of this application, words such as "example" and "for example" are used to represent giving an example, an illustration, or a description. Any embodiment or design scheme described as the "example" in this application should not be explained as being more preferred or having more advantages than another embodiment or design scheme. Exactly, the word "example" is used to present a concept in a specific manner.

In embodiments of this application, the terms "information (information)", "signal (signal)", "message (message)", "channel (channel)", and "signaling (signaling)" may be interchangeably used sometimes. It should be noted that meanings expressed by the terms are consistent when differences between the terms are not emphasized. The terms "of (of)", "corresponding (corresponding, relevant)", and "corresponding (corresponding)" may be interchangeably used sometimes. It should be noted that meanings expressed by the terms are consistent when differences between the terms are not emphasized.

A system architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems.

FIG. 1 is a schematic diagram 1 of an architecture of a communication system to which a positioning method according to an embodiment of this application is applicable. For ease of understanding of embodiments of this application, the communication system shown in FIG. 1 is first used as an example to describe in detail a communication system used in embodiments of this application. It should be noted that the solutions in embodiments of this application may also be applied to another mobile communication system, and a corresponding name may also be replaced with a name of a corresponding function in the another mobile communication system.

As shown in FIG. 1, the communication system includes a positioning management network element, a positioning measurement network element, and a terminal device.

The positioning management network element is configured to perform the following steps. The positioning management network element sends a positioning measurement request to the positioning measurement network element. The positioning measurement request is used to request the positioning measurement network element to feed back channel state information of the terminal device. Then, the positioning management network element receives a positioning measurement response from the positioning measurement network element. The positioning measurement response includes the channel state information of the terminal device. Then, the positioning management network element determines a location of the terminal device based on the channel state information of the terminal device.

Correspondingly, the positioning measurement network element is configured to perform the following steps. The positioning measurement network element receives the positioning measurement request from the positioning management network element. The positioning measurement request is used to request the positioning measurement network element to feed back the channel state information of the terminal device. Then, the positioning measurement network element sends the positioning measurement response to the positioning management network element. The positioning measurement response includes the channel state information of the terminal device, and the channel state information of the terminal device is used by the positioning management network element to determine the location of the terminal device.

The positioning management network element may be a location management function LMF network element, a location management unit LMU, a location management center LMC integrated on a RAN side, an evolved serving mobile location center (evolved serving mobile location center, E-SMLC), a positioning server, a navigation server, or the like, or may be a chip (system) that may be disposed in the LMF network element, the E-SMLC, the positioning server, or the navigation server, or another component that has a function of the positioning management network element.

In a possible design solution, the positioning measurement network element may be an access network element, for example, a serving access network element of the terminal device or a neighbor access network element of the serving access network element. The access network element is a device that is located on a network side of the communication system and that has a wireless transceiver function, a chip (system) that may be disposed in the device, or another component that has a function of the positioning measurement network element. In embodiments of this application, the access network element may also be referred to as an access network device. The access network element includes but is not limited to: an IIoT access point, an internet of things access point, an access point (access point, AP) in a wireless fidelity (wireless fidelity, Wi-Fi) system, for example, a home gateway, a router, a server, a switch, or a bridge, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), a wireless relay node, a wireless backhaul node, a transmission reception point (transmission reception point, TRP, or transmission point, TP), or the like; may be a 5G access network element, for example, a gNB in a new radio (new radio, NR) system, a transmission point (TRP or TP), or one antenna panel or a group of antenna panels (including a plurality of antenna panels) of a base station in a 5G system; or may be a network node that is included in the gNB or the transmission point, for example, a baseband unit (BBU), a distributed unit (distributed unit, DU), or a road side unit (road side unit, RSU) having a base station function.

In another possible design solution, the positioning measurement network element may alternatively be a to-be-positioned terminal device. The to-be-positioned terminal device may be a terminal that accesses the communication system and has a wireless transceiver function, a chip (system) that may be disposed in the terminal, or another component that has a function of the positioning measurement network element. The terminal device may also be referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application includes but is not limited to: an IIoT terminal, an internet of things terminal, a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a vehicle-mounted terminal, a wearable device, an RSU having a terminal function, and the like. The terminal device in this application may alternatively be a vehicle-mounted module, a vehicle-mounted component, a vehicle-mounted chip, or a vehicle-mounted unit that is built in a vehicle as one or more components or units. The vehicle may implement a positioning method provided in this application by using the vehicle-mounted module, the vehicle-mounted component, the vehicle-mounted chip, or the vehicle-mounted unit that is built in the vehicle.

Figure 2:
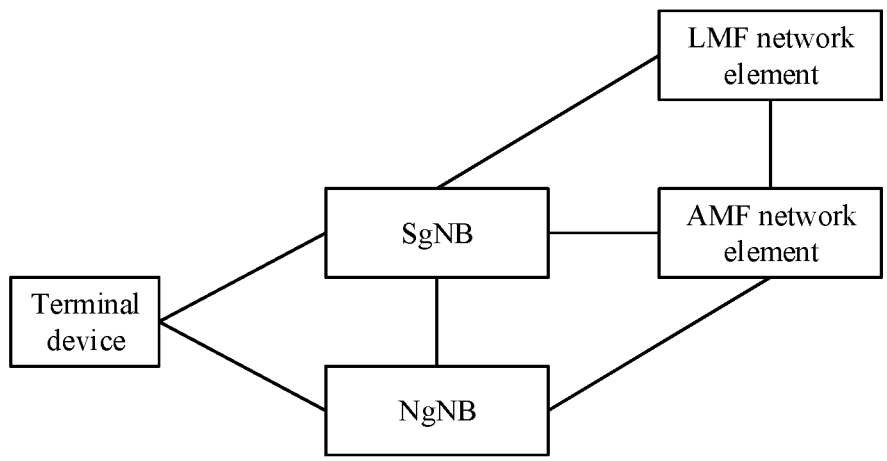
FIG. 2 is a schematic diagram 2 of an architecture of a communication system according to an embodiment of this application.

An NR system is used as an example below to further describe a communication system to which a positioning method according to an embodiment of this application is applicable. For example, FIG. 2 is a schematic diagram 2 of an architecture of a communication system to which a positioning method according to an embodiment of this application is applicable. As shown in FIG. 2, the communication system includes an LMF network element, an AMF network element, a serving gNodeB (serving gNodeB, SgNB), a neighbor gNodeB (neighbor gNodeB, NgNB), and a terminal device. The positioning management network element shown in FIG. 1 may be the LMF network element shown in FIG. 2, and the positioning measurement network element shown in FIG. 1 may include one or more of the SgNB, the NgNB, or the terminal device shown in FIG. 2. The AMF network element shown in FIG. 2 may be used as a router between the SgNB and/or the NgNB and the LMF network element, and is configured to: send a positioning measurement request to the SgNB and/or the NgNB, and receive a positioning measurement response from the SgNB and/or the NgNB.

It should be noted that, the positioning method provided in embodiments of this application is applicable to communication between the positioning management network element and the positioning measurement network element shown in FIG. 1, communication between the LMF network element and the SgNB and/or the NgNB shown in FIG. 2, or communication between the LMF network element and the terminal device shown in FIG. 2. For a specific implementation, refer to the following method embodiments. Details are not described herein.

It should be understood that FIG. 1 and FIG. 2 are only simplified schematic diagrams of examples for ease of understanding. The communication system may further include another network device and/or another terminal device, which are/is not shown in FIG. 1 and FIG. 2.

Figure 3:
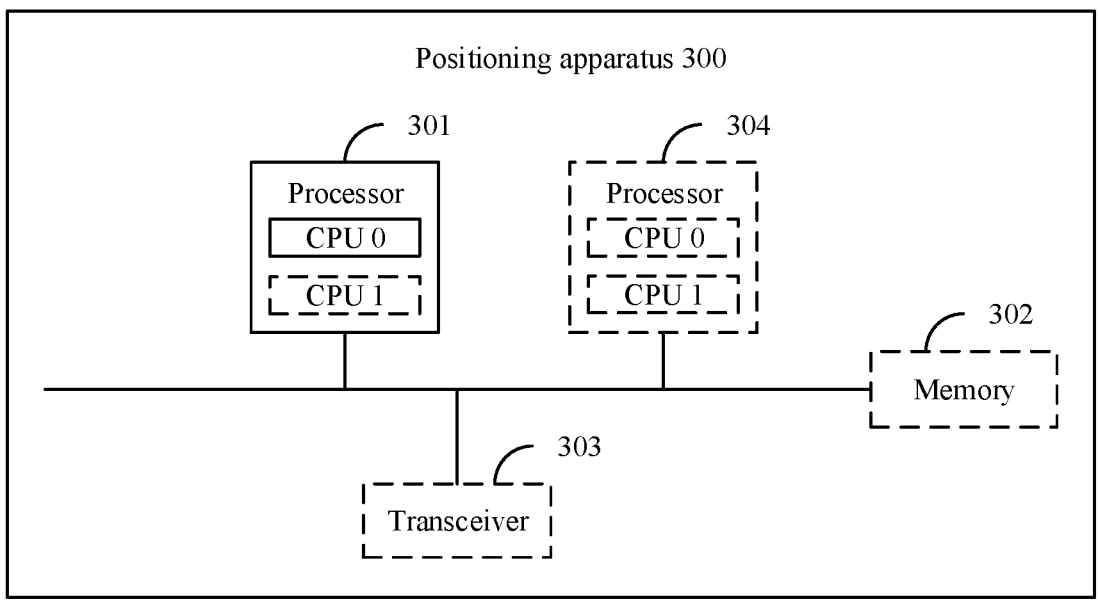
FIG. 3 is a schematic diagram 1 of a structure of a positioning apparatus according to an embodiment of this application.

FIG. 3 is a schematic diagram 1 of a structure of a positioning apparatus that may be configured to perform the positioning method provided in embodiments of this application. In a possible design solution, the positioning apparatus may be the foregoing positioning management network element, or may be a chip (system) that may be used in the positioning management network element or another component that has a function of the positioning management network element.

In another possible design solution, the positioning apparatus may be the foregoing positioning measurement network element, or may be a chip (system) that may be used in the positioning measurement network element or another component that has a function of the positioning measurement network element. Optionally, the positioning apparatus may be a terminal device, or may be a chip (system) that may be used in the terminal device or another component that has a function of the terminal device. Alternatively, optionally, the positioning apparatus may be an access network element, or may be a chip (system) that may be used in the access network element or another component that has a function of the access network element.

As shown in FIG. 3, the positioning apparatus 300 may include a processor 301. Optionally, the positioning apparatus 300 may further include one or more of a memory 302 or a transceiver 303. The processor 301 may be integrated with one or more of the memory 302 or the transceiver 303, or may be coupled to one or more of the memory 302 or the transceiver 303, for example, may be connected to one or more of the memory 302 or the transceiver 303 by using a communication bus. This is not specifically limited in this embodiment of this application.

The following describes each composition component of the positioning apparatus 300 in detail with reference to FIG. 3.

The processor 301 is a control center of the positioning apparatus 300, and may be one processor or may be a collective term of a plurality of processing elements. For example, the processor 301 may be one or more central processing units (central processing units, CPUs) or an application-specific integrated circuit (application-specific integrated circuit, ASIC), or may be configured as one or more integrated circuits implementing embodiments of this application, for example, one or more microprocessors (digital signal processors, DSPs) or one or more field programmable gate arrays (field programmable gate arrays, FPGAs).

The processor 301 may perform various functions of the positioning apparatus 300 by running or executing a software program stored in the memory 302 and invoking data stored in the memory 302, for example, may perform a function of a positioning management network element or a function of a positioning measurement network element in the following method embodiments.

During specific implementation, in an embodiment, the processor 301 may include one or more CPUs, for example, a CPU 0 and a CPU 1 shown in FIG. 3.

During specific implementation, in an embodiment, the positioning apparatus 300 may alternatively include a plurality of processors, for example, the processor 301 and a processor 304 shown in FIG. 3. Each of the processors may be a single-core processor (single-CPU) or a multi-core processor (multi-CPU). The processor herein may be one or more communication devices, circuits, and/or processing cores configured to process data (for example, computer program instructions).

The memory 302 may be a read-only memory (read-only memory, ROM) or another type of static storage communication device that can store static information and instructions, a random access memory (random access memory, RAM) or another type of dynamic storage communication device that can store information and instructions, or may be an electrically erasable programmable read-only memory (electrically erasable programmable read-only memory, EEPROM), a compact disc read-only memory (compact disc read-only memory, CD-ROM) or another optical disc storage, an optical disc storage (including a compressed optical disc, a laser disc, an optical disc, a digital versatile disc, a Blu-ray disc, or the like), a magnetic disk storage medium or another magnetic storage communication device, or any other medium that can be configured to carry or store expected program code in a form of an instruction or a data structure and that can be accessed by a computer, but is not limited thereto. The memory 302 may be integrated with the processor, or may exist independently, and is coupled to the processor through an input/output port (not shown in FIG. 3) of the positioning apparatus 300.

The memory 302 is configured to store a software program and data for executing the solutions in this application, and the processor 301 controls the execution. For a specific implementation, refer to the following method embodiments. Details are not described herein.

The transceiver 303 is configured to communicate with another positioning apparatus. For example, the positioning apparatus 300 is a terminal device, and the transceiver 303 may be configured to communicate with a positioning management network element or an access network element, or communicate with another terminal device. For another example, the positioning apparatus 300 is a positioning management network element, and the transceiver 303 may be configured to communicate with an access network element or a terminal device, or communicate with another core network element. For still another example, the positioning apparatus 300 may alternatively be an access network element, and the transceiver 303 is configured to communicate with a terminal device or a positioning management network element.

In addition, the transceiver 303 may include a receiver and a transmitter (which are not separately shown in FIG. 3). The receiver is configured to implement a receiving function, and the transmitter is configured to implement a sending function. The transceiver 303 may be integrated with the processor, or may exist independently, and is coupled to the processor through the input/output port (not shown in FIG. 3) of the positioning apparatus 300. This is not specifically limited in this embodiment of this application.

It should be noted that the structure of the positioning apparatus 300 shown in FIG. 3 does not constitute a limitation on the positioning apparatus. An actual positioning apparatus may include more or fewer components than those shown in the figure, or combine some components, or have different component arrangement.

Figure 4:
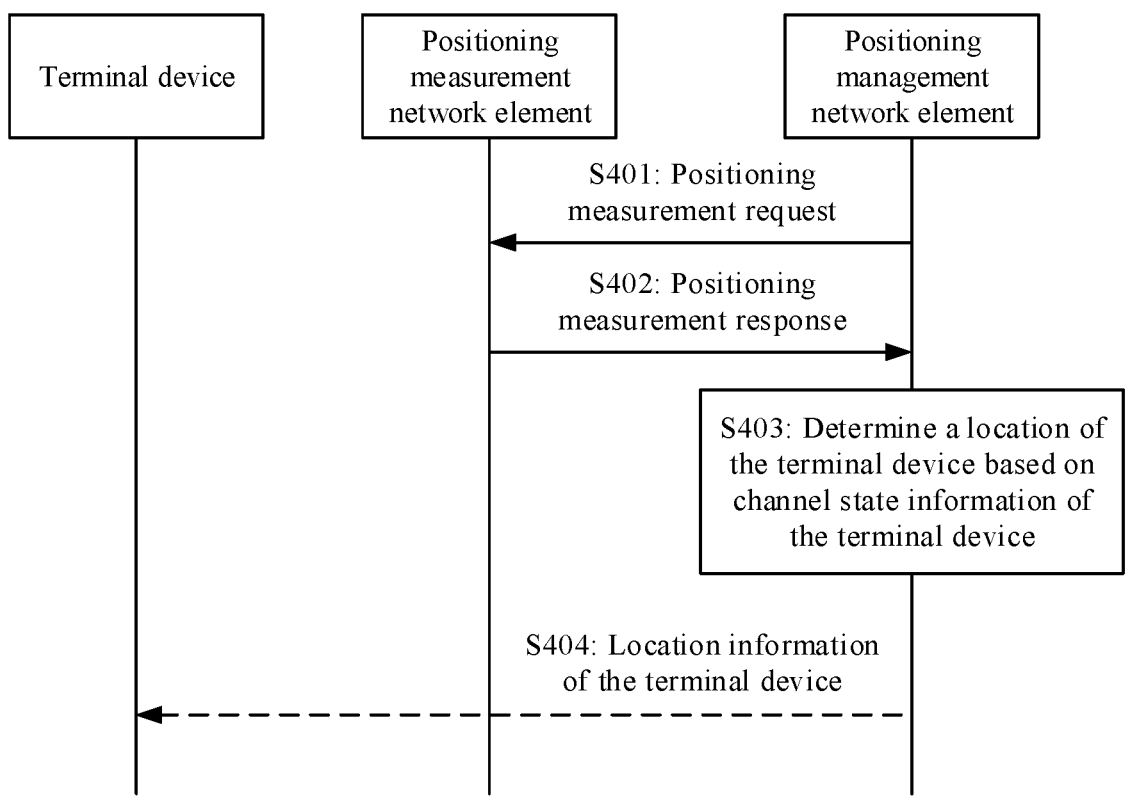
FIG. 4 is a schematic flowchart 1 of a positioning method according to an embodiment of this application.
Figure 5:
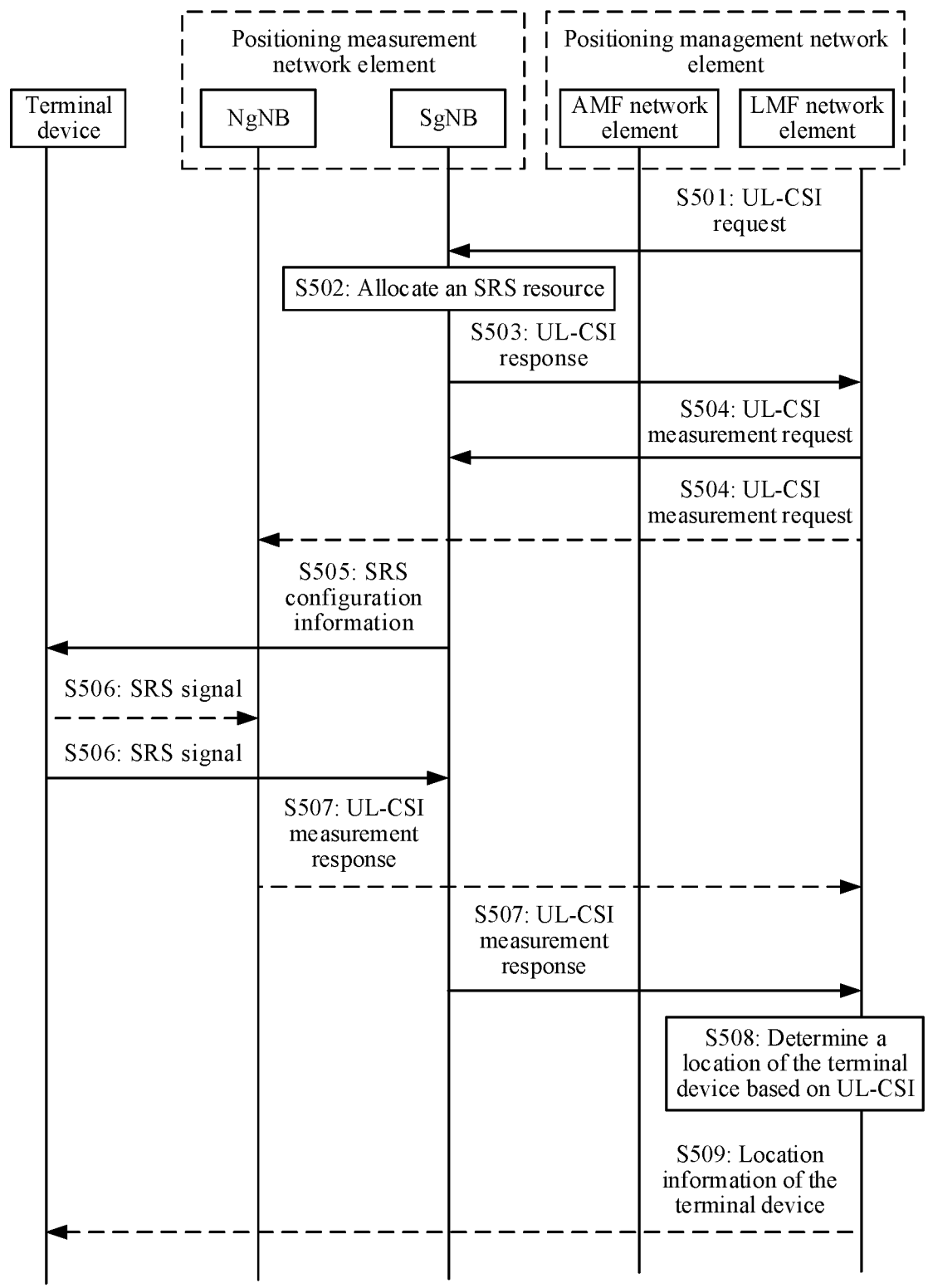
FIG. 5 is a schematic flowchart 2 of a positioning method according to an embodiment of this application.
Figure 6:
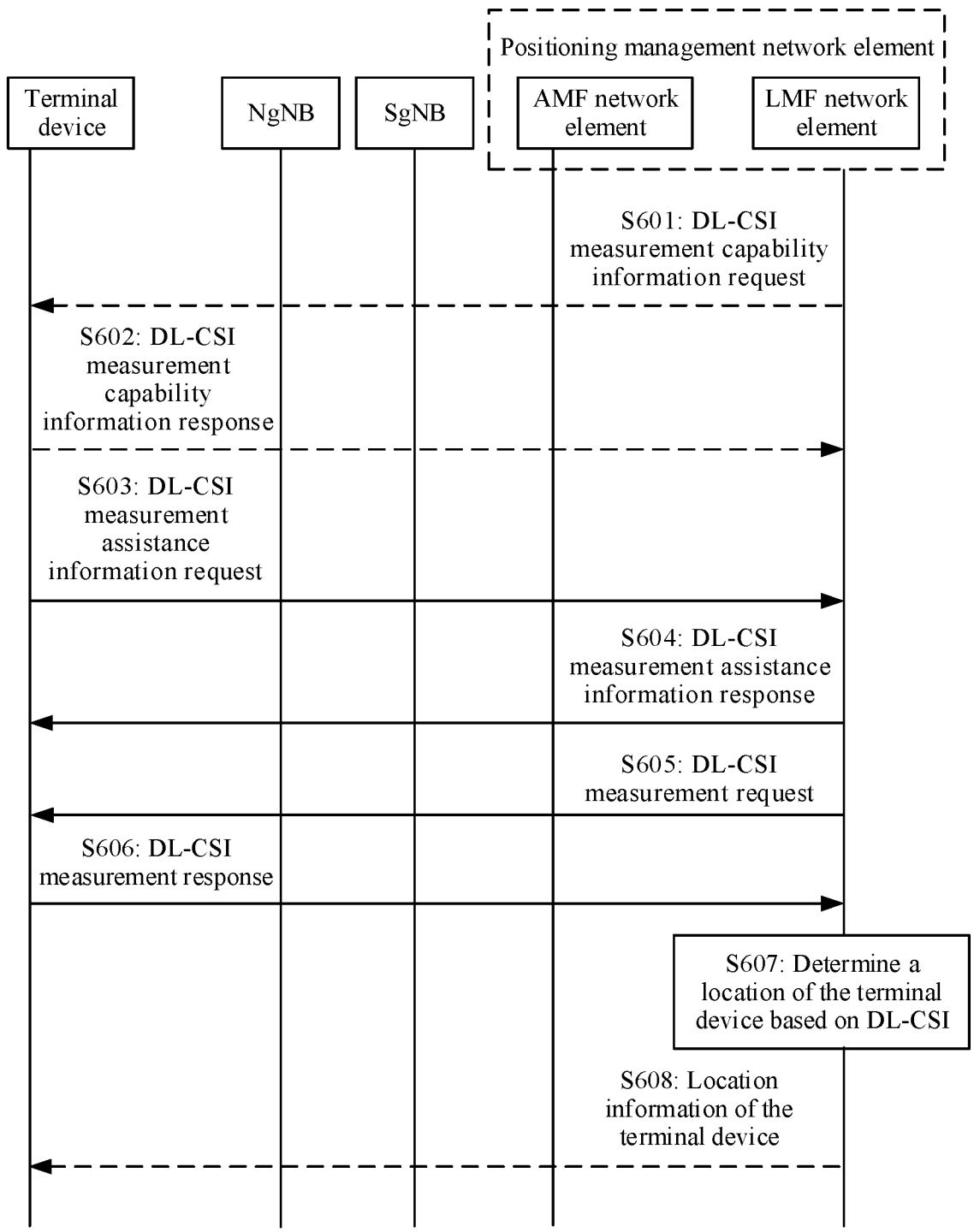
FIG. 6 is a schematic flowchart 3 of a positioning method according to an embodiment of this application.

The following describes in detail the positioning method provided in embodiments of this application with reference to FIG. 4 to FIG. 6.

For example, FIG. 4 is a schematic flowchart 1 of a positioning method according to an embodiment of this application. The positioning method is applicable to communication between the positioning management network element and the positioning measurement network element shown in FIG. 1, is applicable to communication between the LMF network element and the SgNB and/or the NgNB shown in FIG. 2, or is applicable to communication between the LMF network element and the terminal device shown in FIG. 2.

As shown in FIG. 4, the positioning method includes the following steps.

S401: A positioning management network element sends a positioning measurement request to a positioning measurement network element. Correspondingly, the positioning measurement network element receives the positioning measurement request from the positioning management network element.

The positioning measurement request is used to request the positioning measurement network element to feed back channel state information of a terminal device.

In a possible design solution, the channel state information of the terminal device may be distinguished in time domain or frequency domain. To be specific, the channel state information of the terminal device may include time domain channel state information or frequency domain channel state information.

For example, Table 1 is Example 1 of the positioning measurement request provided in this embodiment of this application. As shown in Table 1, the positioning measurement request may include one or more of the following information: reference signal configuration (RS configuration) information, domain (domain) configuration information, antenna port pair (antenna port pair) configuration information, time domain (time domain) information, or frequency domain (frequency domain) information.

The reference signal configuration information is used to indicate configuration information of a reference signal used during channel state measurement, for example, a type (type), an index (index), or an air interface resource (radio resource) configuration of the reference signal. The reference signal may be a sounding reference signal (sounding reference signal, SRS), a positioning reference signal (positioning reference signal, PRS), or a channel state information reference signal (channel state information reference signal, CSI-RS). The index is a number of a configured SRS, PRS, or CSI-RS, and is used to indicate a specific reference signal sequence used by the configured reference signal. The positioning measurement network element may detect the configured reference signal based on the reference signal configuration information, for example, perform a correlation operation or a matched filtering operation by using a local conjugate sequence of the configured reference signal and a received signal of the reference signal, to obtain the channel state information of the terminal device.

The domain configuration information is used to indicate to report the time domain channel state information (time domain channel state information, TD-CSI) or the frequency domain channel state information (frequency domain channel state information, FD-CSI). Optionally, the positioning management network element may determine and indicate that state information to be reported by the positioning measurement network element is the time domain channel state information (corresponding to an option whose value is 1 in Table 1) or the frequency domain channel state information (corresponding to an option whose value is 2 in Table 1).

Alternatively, optionally, the positioning management network element may indicate that state information that is autonomously selected by the positioning measurement network element and that needs to be reported is the time domain channel state information or the frequency domain channel state information (corresponding to an option whose value is 0 in Table 1). In this case, functions of the time domain channel state information and the frequency domain channel state information are equivalent in a process of determining a location of the terminal device. In view of this, based on a data amount of the time domain channel state information and a data amount of the frequency domain channel state information, the positioning measurement network element may autonomously choose to report a specific type of channel state information, for example, report channel state information with a smaller data amount, to save resources, reduce transmission time, and improve positioning efficiency.

The antenna port pair configuration information is used to indicate an antenna port pair whose channel state needs to be reported, for example, indexes or a quantity of antenna port pairs to be reported. 2T2R multiple-input multiple-output (multiple-input multiple-output, MIMO) is used as an example. If transmit antennas are T0 and T1, and receive antennas are R0 and R1, antenna port pairs whose index values are 0 to 3 are sequentially T0R0, T0R1, T1R0, T1R1, and a total quantity of antenna port pairs is 4. If the index values of the antenna port pairs are 0 and 1, the positioning measurement network element measures and reports channel state information of the antenna port pairs T0R0 and T0R1.

The quantity of antenna port pairs is used to indicate the positioning measurement network element to autonomously select, according to a preset rule, an antenna port pair whose channel state information needs to be reported. Optionally, the preset rule may be that an antenna port pair whose channel state information needs to be reported is selected in ascending order of indexes of the antenna port pairs. For example, if the quantity of antenna port pairs is 2, the positioning measurement network element is indicated to autonomously select, according to the preset rule, antenna port pairs to be reported.

Alternatively, optionally, the preset rule may be: measuring channel state information of all antenna port pairs, and selecting, in descending order of channel states corresponding to the channel state information obtained through measurement, an antenna port pair whose channel state information needs to be reported. For example, if the channel state information of all the foregoing four antenna port pairs is sequentially T0R0, T1R1, T0R0, and T1R0 in descending order, and the quantity of antenna port pairs whose channel state information needs to be reported is 2, the positioning measurement network element chooses to report the channel state information of the antenna port pairs T0R0 and T1R1.

It should be understood that the quantity of antenna port pairs whose channel states need to be reported may be a quantity of antenna port pairs, for example, 1 or 2, or may be a proportion of antenna port pairs to be reported, for example, 25% or 50%. This is not specifically limited in this embodiment of this application.

The time domain information is used to indicate a time domain parameter used during channel state measurement, and the frequency domain information is used to indicate a frequency domain parameter used during channel state measurement. The functions of the time domain channel state information and the frequency domain channel state information in the process of positioning the terminal device are equivalent. Therefore, the positioning management network element may select one mode to indicate the positioning measurement network element to measure and report the time domain channel state information or the frequency domain channel state information, to reduce measurement workload and reported data amount of the positioning measurement network element, so that positioning efficiency is improved.

Optionally, as shown in Table 1, the time domain information may include one or more of the following information: a total quantity of paths (quantity of paths) to be reported, a path power threshold (path power threshold), or a path amplitude threshold (path amplitude threshold). In this way, workload of measuring and reporting the time domain channel state information by the positioning measurement network element may be further reduced, thereby further improving the positioning efficiency.

Optionally, as shown in Table 1, the frequency domain information may include one or more of the following information: a frequency-domain range (frequency range) to be reported, a subcarrier spacing (subcarrier interval), or a radio bearer spacing (radio bearer interval). In this way, workload of measuring and reporting the frequency domain channel state information by the positioning measurement network element may be further reduced, thereby further improving the positioning efficiency.

Further, the frequency-domain range to be reported may be represented in one of the following manners: start frequency+end frequency, start frequency+frequency offset, start subcarrier index+end subcarrier index, start subcarrier index+subcarrier offset (in a unit of a subcarrier), start RB index+end RB index, start RB index+RB offset (in a unit of an RB), or the like. This is not specifically limited in this embodiment of this application.

It should be noted that all configuration parameters in the positioning measurement request are optional. When one or more parameters are not configured, it is considered that the positioning measurement network element is indicated to measure and report all channel state information corresponding to the one or more parameters. For example, if the antenna port pair is not configured, it is considered that the positioning measurement network element is indicated to measure and report channel state information of all antenna port pairs. For another example, if the total quantity of paths to be reported is not configured, it is considered that the positioning measurement network element is indicated to measure and report channel state information of all detected multi-paths. For still another example, if the frequency-domain range to be reported is not configured, it is considered that the positioning measurement network element is indicated to measure and report channel state information of all subcarriers or all RBs in system bandwidth of the terminal device.

downlink channel state information (downlink channel state information, DL-CSI) of the terminal device. In this way, the positioning management network element may indicate the positioning measurement network element to select one mode to report the UL-CSI or the DL-CSI, to reduce data amount of channel state information to be reported by the positioning measurement network element, so that the positioning efficiency is improved.

It should be understood that the positioning management network element may receive the UL-CSI or the DL-CSI of the terminal device from different positioning measurement network elements. Details are described below.

Optionally, the positioning measurement network element may include a serving access network (serving access network) element of the terminal device, for example, a serving base station, and/or a neighbor access network (neighbor access network) element of the serving access network element, for example, a neighbor base station of the serving base station. Correspondingly, the channel state information of the terminal device may include the UL-CSI of the terminal device, and the positioning measurement request is used to request the serving access network element of the terminal device and/or the neighbor access network element of the serving access network element to feed back the UL-CSI of the terminal device. In this way, the positioning management network element may indicate only the serving

TABLE 1

| Information name | | Description |
|---|---|---|
| Reference signal configuration information | — | Indicates configuration information of a reference signal used during channel state measurement, for example, a type, an index, or an air interface resource of the reference signal. |
| Domain configuration information | — | 0: Indicates to report the time domain channel state information; 1: Indicates to report the frequency domain channel state information; or 2: The positioning measurement network element determines to report the time domain channel state information or the frequency domain channel state information. |
| Antenna port pair configuration information | — | Indicates a quantity or indexes of antenna port pairs whose channel state information needs to be reported. |
| Time domain information | Total quantity of paths to be reported | Indicates the total quantity of paths to be reported. |
| | Path power threshold | Indicates to report a measurement result of a path whose power is greater than the path power threshold. |
| | Path amplitude threshold | Indicates to report a measurement result of a path whose amplitude is greater than the path amplitude threshold. |
| Frequency domain information | Frequency-domain range to be reported | Indicates a frequency-domain range corresponding to a frequency domain channel state to be reported, for example, a frequency range, a subcarrier range, or an RB range to be reported. |
| | Subcarrier spacing | Indicates a quantity of subcarriers between any two adjacent subcarriers to be reported, for example, two subcarriers or four subcarriers. |
| | Radio bearer RB spacing | Indicates a quantity of RBs between any two adjacent RBs to be reported, for example, two RBs or three RBs. |

In another possible design solution, the channel state information of the terminal device may alternatively be distinguished based on a signal transmission direction. To be specific, the channel state information of the terminal device may include uplink channel state information (uplink channel state information, UL-CSI) of the terminal device and access network element of the terminal device or the neighbor access network element of the serving access network element to measure and report the UL-CSI of the terminal device, to reduce a quantity of positioning measurement network elements and measurement workload, so that the positioning efficiency is improved.

Optionally, the reference signal configuration information may include configuration information of an uplink reference signal such as an SRS. The configuration information of the uplink reference signal may include one or more of the following information: a time domain configuration, a frequency domain configuration, a port number, or beam (beam) information of the SRS. In this way, the serving access network element of the terminal device and/or the neighbor access network element of the serving access network element may measure only UL-CSI of a terminal device corresponding to a configured SRS, to further reduce measurement workload of the positioning measurement network element, so that the positioning efficiency is further improved.

It should be noted that when the positioning measurement network element is the access network element, the access network element further needs to send the configuration information of the SRS to the terminal device, for example, an index, the time domain configuration, the frequency domain configuration, the port number, or the beam (beam) information of the SRS, to indicate the terminal device to send the SRS based on the configuration information of the SRS, for example, send an SRS carrying a specified SRS sequence, on a specified time-frequency resource on a specified beam of a specified antenna port. Correspondingly, the positioning measurement network element may detect the SRS sent by the terminal device, to obtain the UL-CSI.

Optionally, the positioning measurement network element may alternatively be the terminal device, the channel state information of the terminal device may include the downlink channel state information DL-CSI of the terminal device, and the positioning measurement request is used to request the DL-CSI of the terminal device. In this way, the positioning management network element may indicate only the terminal device to measure the DL-CSI of the terminal device, to reduce a quantity of positioning measurement network elements and measurement workload, so that the positioning efficiency is improved.

Optionally, the reference signal configuration information may include configuration information of a downlink reference signal such as a PRS or a CSI-RS. The configuration information of the downlink reference signal may include one or more of the following information: a time domain configuration, a frequency domain configuration, a port number, or beam (beam) information of the PRS, or a time domain configuration, a frequency domain configuration, a port number, or beam (beam) information of the CSI-RS. In this way, the terminal device may measure only DL-CSI of a terminal device corresponding to a configured PRS or CSI-RS, to further reduce measurement workload of the terminal device, so that the positioning efficiency is further improved.

It should be noted that, when the positioning measurement network element is the terminal device, the serving access network element may further forward the positioning measurement request to the terminal device. The terminal device may generate a local conjugate sequence of the PRS or CSI-RS based on the reference signal configuration information in the positioning measurement request, for example, the configuration information of the PRS or CSI-RS, then detect a received reference signal by using the local conjugate sequence, to obtain the DL-CSI of the terminal device, and report the DL-CSI to the positioning measurement network element via the serving access network element based on the positioning measurement request. Correspondingly, after receiving the positioning measurement request from the positioning management network element, the access network element, for example, the serving access network element and/or the neighbor access network element, may send the PRS signal or the CSI-RS to the terminal device based on the configuration information of the PRS or the CSI-RS, for example, the index, the time domain configuration, the frequency domain configuration, the port number, or the beam (beam) information of the PRS or the CSI-RS, for example, send an SRS carrying a specified PRS sequence or a specified CSI-RS sequence on a specified time-frequency resource on a specified beam of a specified antenna port. In this way, the terminal device may measure only DL-CSI of a terminal device corresponding to a PRS or CSI-RS sent by the serving access network element or the neighbor access network element, to further reduce measurement workload of the positioning measurement network element, so that the positioning efficiency is further improved.

Optionally, the positioning measurement request may be determined by the positioning management network element based on DL-CSI measurement capability information of the terminal device. In this way, the positioning management network element may determine, based on the DL-CSI measurement capability information of the terminal device, content of a measurement task of the terminal device and content of the DL-CSI reported by the terminal device, to avoid invalid signaling exchange caused by delivery of a measurement task exceeding a DL-CSI measurement capability of the terminal device to the terminal device, so that the positioning efficiency is improved.

Further, before the positioning management network element sends the positioning measurement request to the positioning measurement network element, the positioning method shown in FIG. 4 may further include the following step.

The terminal device sends the DL-CSI measurement capability information of the terminal device to the positioning management network element. Correspondingly, the positioning management network element receives the DL-CSI measurement capability information of the terminal device. The DL-CSI measurement capability information of the terminal device is used by the positioning management network element to determine the positioning measurement request, for example, determine configuration information carried in the positioning measurement request.

It should be understood that the terminal device may actively send the DL-CSI measurement capability information of the terminal device to the positioning management network element. For example, the terminal device may report the DL-CSI measurement capability information of the terminal device to the positioning management network element via the serving access network element during network registration, or may send the DL-CSI measurement capability information of the terminal device to the positioning management network element after receiving a DL-CSI measurement capability query request from the positioning management network element.

It should be further understood that, in addition to the terminal device, the positioning management network element may also obtain the DL-CSI measurement capability information of the terminal device from another network element such as the serving access network element, an AMF network element, or an OAM network element. An implementation in which the positioning management network element obtains the DL-CSI measurement capability information of the terminal device is not specifically limited in this embodiment of this application.

Optionally, the positioning measurement request may further include one or more of the following information: configuration information of the serving access network element of the terminal device or configuration information of the neighbor access network element of the serving access network element, for example, neighbor cell configuration information, base station identifiers, cell identifiers, or location information of the foregoing access network elements. Further, the terminal device may be positioned with reference to measurement results of downlink reference signals transmitted by the terminal device to a plurality of cells, to further improve the positioning accuracy.

It should be noted that the solution in which the channel state information is distinguished in time domain or frequency domain and the solution in which the channel state information is distinguished based on the signal transmission direction may alternatively be used in combination, to further reduce the measurement workload of the positioning measurement network element, so that the positioning efficiency is improved. For example, the terminal device may be indicated to report only DL-CSI in time domain. For another example, the access network element may be indicated to report only UL-CSI in frequency domain. A combination manner of the two solutions is not specifically limited in this embodiment of this application.

S402: The positioning measurement network element sends a positioning measurement response to the positioning management network element. Correspondingly, the positioning management network element receives the positioning measurement response from the positioning measurement network element.

The positioning measurement response includes the channel state information of the terminal device.

In a possible design solution, the channel state information of the terminal device may be distinguished in time domain or frequency domain. To be specific, the channel state information of the terminal device may include the time domain channel state information or the frequency domain channel state information.

For example, Table 2 is Example 1 of the channel state information of the terminal device provided in this embodiment of this application. As shown in Table 2, the positioning measurement response may include one or more of the following information: domain indication information, antenna port pair indication information, the time domain channel state information, or the frequency domain channel state information.

The antenna port pair indication information is used to indicate an antenna port pair corresponding to the channel state information of the terminal device, for example, indexes or a quantity of reported antenna port pairs. For a specific implementation of the indexes or the quantity of reported antenna port pairs, refer to the specific implementation of the indexes or the quantity of antenna port pairs to be reported in the antenna port pair configuration information in S401. Details are not described herein.

TABLE 2

| Information name | | Description |
| --- | --- | --- |
| Domain indication information | — | 0: Indicates that the reported channel state information is the time domain channel state information; or 1: Indicates that the reported channel state information is the frequency domain channel state information. |
| Antenna port pair indication information | — | Indicates information about an antenna port pair corresponding to the reported channel state information, for example, a quantity or an index. |
| Time domain channel state information | Total quantity of reported paths | Indicates a total quantity of paths corresponding to time domain channel state information of each reported antenna port pair. |
| | Delay of each of the reported paths | Indicates a transmission delay of each of the reported paths. |
| | Power of each of the reported paths | Indicates the power of each of the reported paths. |
| | Amplitude of each of the reported paths | Indicates the amplitude of each of the reported paths. |
| | Phase of each of the reported paths | Indicates the phase of each of the reported paths. |
| Frequency domain channel state information | Quantity of reported subcarriers | Indicates a quantity of subcarriers corresponding to frequency domain channel state information of each reported antenna port pair. |
| | Amplitude of each of the reported subcarriers | Indicates the amplitude of each of the reported subcarriers. |
| | Power of each of the reported subcarriers | Indicates the power of each of the reported subcarriers. |
| | Phase of each of the reported subcarriers | Indicates the phase of each of the reported subcarriers. |
| | Quantity of reported RBs | Indicates a quantity of RBs corresponding to frequency domain channel state information of each reported antenna port pair. |

TABLE 2-continued

| Information name | Description |
| --- | --- |
| Amplitude of each of the reported RBs | Indicates the amplitude of each of the reported RBs. |
| Power of each of the reported RBs | Indicates the power of each of the reported RBs. |
| Phase of each of the reported RBs | Indicates the phase of each of the reported RBs. |

The domain indication information is used to indicate that the reported channel state information of the terminal device is the time domain channel state information or the frequency domain channel state information. With reference to Table 1, a value of the domain indication information may be determined by the positioning management network element, and delivered to the positioning measurement network element by using a domain configuration information field (field) (with a value of 0 or 1) in the positioning measurement request, or may be determined by the positioning measurement network element based on an indication of the domain configuration information field with a value of 2 in the positioning measurement request. For example, the positioning measurement network element may choose to report channel state information with a smaller data amount in the time domain channel state information and the frequency domain channel state information of the terminal device. The functions of the time domain channel state information and the frequency domain channel state information in the process of positioning the terminal device are equivalent. In this way, the positioning management network element may indicate the positioning measurement network element to select one mode to report the time domain channel state information or the frequency domain channel state information, to reduce data amount of channel state information to be reported by the positioning measurement network element, so that the positioning efficiency is improved.

Optionally, as shown in Table 2, the time domain channel state information may include one or more of the following information: the total quantity of reported paths, the delay of each of the reported paths, the amplitude of each of the reported paths, the power of each of the reported paths, or the phase of each of the reported paths. In this way, data amount of the time domain channel state information to be reported by the positioning measurement network element may be further reduced, thereby further improving the positioning efficiency.

Optionally, as shown in Table 2, the frequency domain channel state information may include one or more of the following information: the quantity of reported subcarriers, the amplitude of each of the reported subcarriers, the power of each of the reported subcarriers, the phase of each of the reported subcarriers, the quantity of reported radio bearer RBs, the amplitude of each of the reported RBs, the power of each of the reported RBs, or the phase of each of the reported RBs. In this way, data amount of the frequency domain channel state information to be reported by the positioning measurement network element may be further reduced, thereby further improving the positioning efficiency.

It should be noted that all the items shown in Table 2 are optional. For example, with reference to Table 1, if the value of the domain configuration information field in the positioning measurement request is 0 or 1, that is, the positioning management network element has clearly indicated the positioning measurement network element to report the time domain channel state information or the frequency domain channel state information, the positioning measurement network element may not report the domain indication information field in Table 2. For another example, with reference to Table 1, if the value of the antenna port pair configuration information field in the positioning measurement request is an index of an antenna port pair to be reported, that is, the positioning management network element has clearly indicated antenna port pairs whose channel state information is reported by the positioning measurement network element, or the value of the antenna port pair configuration information field in the positioning measurement request is a quantity of antenna port pairs to be reported, and both the positioning management network element and the positioning measurement network element can uniquely determine an antenna port pair corresponding to the reported channel state information based on the quantity of antenna port pairs to be reported and according to a preset rule, the positioning measurement network element may not report the antenna port pair indication information field in Table 2. For another example, functions of the time domain channel state information and the frequency domain channel state information in the process of determining the location of the terminal device are equivalent. In view of this, the positioning measurement network element may report only one type of the channel state information. In this way, an amount of data reported by the positioning measurement network element may be further reduced, thereby reducing reporting resource overheads.

Further, in addition to the content shown in Table 2, the positioning measurement network element may further report, to the positioning management network element, access network element information and/or a reference signal measurement result shown in Table 3. Details are described below.

As shown in Table 3, the access network element information may include one or more of the following information: location information (location information), antenna array information (antenna array information), a normal direction of an antenna array (normal direction of antenna array), or the like of an access network element. The location information is used to indicate a reported location of each access network element, and may include one or more of the following: geographical coordinates, a GPS positioning result, an identifier of the access network element that is in a one-to-one correspondence with the location of the access network element, or the like. The antenna array information is used to indicate a reported array element arrangement manner, quantity of array elements, or the like of each antenna array of each access network element. The normal direction of the antenna is used to indicate a reported normal direction of each antenna of each access network element, and may include, for example, one or more of the following:

a downtilt, an azimuth, an antenna height, or the like. In this way, the location of the terminal device may be determined by combining the access network element information and the reported channel state information. For example, after the location of the terminal device is determined based on the channel state information, the location may be further corrected with reference to the location information of the access network element, so that the positioning accuracy is further improved.

The reference signal measurement result may include one or more of the following information: reference signal received power (reference signal received power, RSRP) or reference signal received quality (reference signal received quality, RSRQ). In this way, the positioning accuracy may be further improved with reference to the RSRP and/or the RSRQ.

cation) between a plurality of preset locations and a plurality of pieces of preset channel state information may be established. For example, the one-to-one correspondence may be recorded through actual measurement. Then, the location of the terminal device is determined based on a result of matching between the channel state information of the terminal device that is reported by the positioning measurement network element and the plurality of pieces of preset channel state information.

Specifically, fingerprint database positioning needs to go through two phases: an offline database creation phase and an online positioning phase. At the offline database creation phase, the fingerprint database is established by collecting channel state information between a preset location point and reference nodes such as the foregoing access network elements. That is, the preset location point is associated with

TABLE 3

| | Information name | Description |
| --- | --- | --- |
| Access network element information | Location information | Indicates a reported location of each access network element, and may include geographical coordinates, a GPS positioning result, an identifier of an access network element that is in a one-to-one correspondence with the location, or the like. |
| | Antenna array information | Indicates a reported array element arrangement manner, quantity of array elements, or the like of each antenna array of each access network element. |
| | Normal direction of an antenna | Indicates a reported normal direction of each antenna of each access network element. |
| Reference signal measurement result | Reference signal indication information | Indicates information about a reference signal used during positioning and measurement, for example, a type or an index. |
| | RSRP | Indicates detected reference signal received power, for example, SRS received power detected by the access network element, or PRS or CSI-RS received power detected by the terminal device. |
| | RSRQ | Indicates quality of a received reference signal, for example, signal quality of an SRS received by the access network element, or signal quality of a PRS or a CSI-RS received by the terminal device. |

In another possible design solution, the channel state information of the terminal device may alternatively be distinguished based on a signal transmission direction. To be specific, the channel state information of the terminal device may include uplink channel state information UL-CSI of the terminal device and downlink channel state information DL-CSI of the terminal device.

Optionally, the channel state information of the terminal device may include uplink channel state information UL-CSI of the terminal device, and the positioning measurement request is used to request the access network element to feed back the UL-CSI of the terminal device.

S403: The positioning management network element determines the location of the terminal device based on the channel state information of the terminal device.

In a possible design solution, that the positioning management network element determines the location of the terminal device based on the channel state information of the terminal device in S403 may include: The positioning management network element determines the location of the terminal device based on a correspondence between the channel state information of the terminal device and location information. For example, a one-to-one correspondence (which is referred to as a fingerprint database in this applithe collected channel state information. At the online positioning phase, channel state information collected in real time is compared with the channel state information in the fingerprint database, to determine the location of the terminal device. For example, a preset location point corresponding to a group of channel state information that is in the fingerprint database and that has a highest matching degree with the channel state information collected in real time may be determined as a current location of the terminal device. Typical positioning algorithms that are widely used mainly include a kernel function method, a nearest neighbor method, a maximum likelihood probability method, a naive Bayes method, and the like. For specific implementations of the positioning algorithms, refer to an existing technology. Details are not described in this embodiment of this application.

For example, Table 4 is an example of the fingerprint database provided in this embodiment of this application. As shown in Table 4, the fingerprint database may include the following information: location information of a preset location point, and one or more groups of channel state information corresponding to each reference node of each preset location point.

TABLE 4

| Location information of the preset location point | Access network element information | Channel state information | Reference signal measurement result |
|---|---|---|---|
| P1 | RAN1 | UL-T0R0-TD-CSI | UL-RSRP and UL-RSRQ of T0R0 |
|  |  | UL-T0R0-FD-CSI |  |
|  |  | UL-T0R1-TD-CSI | UL-RSRP and UL-RSRQ of T0R1 |
|  |  | UL-T0R1-FD-CSI |  |
|  |  | UL-T1R0-TD-CSI | UL-RSRP and UL-RSRQ of T1R0 |
|  |  | UL-T1R0-FD-CSI |  |
|  |  | UL-T1R1-TD-CSI | UL-RSRP and UL-RSRQ of T1R1 |
|  |  | UL-T1R1-FD-CSI |  |
|  |  | DL-T0R0-TD-CSI | DL-RSRP and DL-RSRQ of T0R0 |
|  |  | DL-T0R0-FD-CSI |  |
|  |  | DL-T0R1-TD-CSI | DL-RSRP and DL-RSRQ of T0R1 |
|  |  | DL-T0R1-FD-CSI |  |
|  |  | DL-T1R0-TD-CSI | DL-RSRP and DL-RSRQ of T1R0 |
|  |  | DL-T1R0-FD-CSI |  |
|  |  | DL-T1R1-TD-CSI | DL-RSRP and DL-RSRQ of T1R1 |
|  |  | DL-T1R1-FD-CSI |  |
|  | RAN2 | . . . | . . . |
| P2 | . . . | . . . | . . . |
| . . . | . . . | . . . | . . . |

The preset location point P1 and the reference node RAN1 are used as an example. The channel state information of the terminal device may include the following one or more groups of channel state information: UL-T0R0-TD-CSI, UL-T0R0-FD-CSI, UL-T0R1-TD-CSI, UL-T0R0-FD-CSI, UL-T1R0-TD-CSI, UL-T1R0-FD-CSI, UL-T1R1-TD-CSI, UL-T1R1-FD-CSI, DL-T0R0-TD-CSI, DL-T0R0-FD-CSI, DL-T0R0-TD-CSI, DL-T0R0-FD-CSI, DL-T1R0-TD-CSI, DL-T1R0-FD-CSI, DL-T1R1-TD-CSI, or DL-T1R1-FD-CSI. UL and DL respectively represent uplink and downlink, TD and FD respectively represent a time domain and a frequency domain, TxRy represents an antenna port pair, x is a transmit antenna port number, and y is a receive antenna port number. For different reference signal transmission directions, a transmit antenna and a receive antenna in the TxRy are different. For example, in an uplink direction, the transmit antenna is a transmit antenna of the terminal device, and the receive antenna is a receive antenna of the reference node. In a downlink direction, the transmit antenna is a transmit antenna of the reference node, and the receive antenna is a receive antenna of the terminal device.

It should be noted that, for specific content of each group of channel state information shown in Table 4, refer to the related content in Table 2. Details are not described herein again.

Further, as shown in Table 4, the fingerprint database may further include information about a reference node such as each access network element, and/or the reference signal measurement result such as RSRP and/or RSRQ corresponding to each antenna port pair, to further improve the positioning accuracy. For specific implementations of the access network element information and the reference signal measurement result, refer to Table 3. Details are not described herein again.

It should be noted that Table 4 lists in detail only a correspondence between the preset location point P1 and the channel state information, access network element information, and reference signal measurement result of the reference node RAN1. The fingerprint database shown in Table 4 may further include: a correspondence between the preset location point P1 and channel state information, access network element information, and a reference signal measurement result of another reference node such as RAN2, and a correspondence between another preset location point such as P2 other than the preset location point P1 and channel state information, access network element information, and a reference signal measurement result of one or more reference nodes corresponding to P2. For specific implementations, refer to Table 4. Details are not described in this embodiment of this application.

Optionally, if the positioning management network element needs to send an instruction related to location information of the positioning management network element to the terminal device, for example, an auto-driving instruction, a navigation instruction, or an IIoT operation instruction, the positioning management network element may further send location information of the terminal device to the terminal device. That is, the positioning method shown in FIG. 4 may further include S404.

S404: The positioning management network element sends the location information of the terminal device to the terminal device. Correspondingly, the terminal device receives the location information of the terminal device from the positioning management network element.

It should be noted that, in communication systems using different standards, the positioning management network element and the positioning measurement network element shown in FIG. 1 and FIG. 4 may have different names. Further, in communication systems using a same standard, the positioning measurement network element may include different network elements based on different transmission directions of a reference signal used during positioning and measurement. With reference to the NR system shown in FIG. 2, a specific implementation of the positioning method shown in FIG. 4 in the NR system is described in detail.

For example, FIG. 5 is a schematic flowchart 2 of a positioning method according to an embodiment of this application. The positioning method is applicable to communication between the LMF network element shown in FIG. 2 and an access network element, for example, an SgNB and/or an NgNB. The LMF network element is a positioning management network element, the SgNB and/or the NgNB are/is positioning measurement network elements/a positioning measurement network element, and the terminal device is a to-be-positioned terminal device.

As shown in FIG. 5, the positioning method includes the following steps.

S501: The LMF network element sends an uplink channel state information (uplink channel state information, UL-CSI) request (request) to the SgNB. Correspondingly, the SgNB receives the UL-CSI request from the LMF network element.

The UL-CSI request includes SRS configuration information, for example, an SRS index, and is used to trigger the terminal device to periodically send an SRS, to provide a condition for a UL-CSI-based positioning operation.

Optionally, the UL-CSI request may be sent by using an NR positioning protocol annex (NR positioning protocol annex, NRPPa) message. The message may include: a message type (message type), an NRPPa transaction identifier (NRPPa transaction ID), a requested SRS transmission parameter (requested SRS transmission characteristics), and the like Optionally, the LMF network element may send the UL-CSI request to the SgNB via the AMF network element. Correspondingly, the SgNB may receive the UL-CSI request from the LMF network element via the AMF network element.

S502: The SgNB allocates an SRS resource.

The SRS resource may include a time domain resource, a frequency domain resource, and the like for sending the SRS by the terminal device. The SRS resource is also used by the SgNB and/or the NgNB to measure the SRS sent by the terminal device, to obtain UL-CSI.

It should be noted that, when there is no available resource, the SgNB allocates an empty resource to the terminal device.

Optionally, the SgNB may further determine a positioning measurement network element, and send configuration information of the positioning measurement network element to the LMF network element. The positioning measurement network element may include the SgNB and/or one or more NgNBs.

S503: The SgNB sends a UL-CSI response (response) to the LMF network element. Correspondingly, the LMF network element receives the UL-CSI response from the SgNB.

The UL-CSI response includes configuration information of the SRS resource allocated by the SgNB to the terminal device.

It should be noted that when an SRS resource returned by the SgNB to the LMF network element is an empty resource, the LMF network element determines to use another positioning method to determine a location of the terminal device.

Optionally, the SgNB may further send the configuration information of the positioning measurement network element determined in S502 to the LMF network element.

Specifically, the SgNB may send the configuration information of the SRS resource to the LMF network element by using an NRPPa message.

Optionally, the SgNB may send the uplink channel state information response to the LMF network element via the AMF network element. Correspondingly, the LMF network element may receive the uplink channel state information response from the SgNB via the AMF network element.

For specific implementations of S501 to S503, refer to an existing technology. Details are not described in this embodiment of this application.

After S501 to S503 are completed, the LMF network element has completed handshake (handshake) with the SgNB, to determine that the positioning measurement network element includes the SgNB. Then, the LMF network element sends a positioning measurement request to the SgNB, that is, performs S504.

S504: The LMF network element sends a UL-CSI measurement request to the SgNB. Correspondingly, the SgNB receives the UL-CSI measurement request from the LMF network element.

For specific content of the UL-CSI measurement request, refer to the content of the positioning measurement request in Table 1. Details are not described herein again.

Optionally, if the positioning measurement network element determined in S502 includes one or more NgNBs, the LMF network element may further send the UL-CSI measurement request to the one or more NgNBs. Correspondingly, the one or more NgNBs receive the UL-CSI measurement request from the LMF network element. In this way, the LMF network element may determine the location of the terminal device with reference to UL-CSI of a plurality of positioning measurement network elements, to improve positioning accuracy.

Specifically, the LMF network element may send the configuration information of the SRS resource to the SgNB and/or the one or more NgNBs by using an NRPPa message.

Optionally, the LMF network element may send the UL-CSI measurement request to the SgNB and/or the one or more NgNBs via the AMF network element. Correspondingly, the SgNB and/or the one or more NgNBs may receive the UL-CSI measurement request from the LMF network element via the AMF network element.

S505: The SgNB sends the SRS configuration information to the terminal device. Correspondingly, the terminal device receives the SRS configuration information from the SgNB.

The SRS configuration information may include an SRS sequence index, configuration information of the time domain resource and frequency domain resource for sending the SRS by the terminal device, and the like, so that the terminal device generates the SRS, and sends the SRS on the configured SRS time domain resource and frequency domain resource.

S506: The terminal device sends the SRS. Correspondingly, the SgNB receives the SRS from the terminal device, and measures UL-CSI of the terminal device.

Optionally, if the positioning measurement network element determined in S502 includes one or more NgNBs, the one or more NgNBs also receive the SRS from the terminal device, and measures the UL-CSI of the terminal device.

For a specific implementation of measuring the UL-CSI, refer to the existing technology. This is not limited in this embodiment of this application.

S507: The SgNB sends a UL-CSI measurement response to the LMF network element. Correspondingly, the LMF network element receives the UL-CSI measurement response from the SgNB.

Optionally, if the positioning measurement network element determined in S502 includes one or more NgNBs, the one or more NgNBs also send the UL-CSI measurement response to the LMF network element.

For specific content of the UL-CSI measurement response, refer to the content of the positioning measurement response in Table 2 and Table 3 in S402. Details are not described herein again.

Specifically, the SgNB and/or the one or more NgNBs may send the UL-CSI measurement response to the LMF network element by using an NRPPa message.

Optionally, the SgNB and/or the one or more NgNBs may send the UL-CSI measurement response to the LMF network element via the AMF network element. Correspondingly, the LMF network element may receive the UL-CSI measurement response from the SgNB and/or the one or more NgNBs via the AMF network element.

S508: The LMF network element determines the location of the terminal device based on the UL-CSI.

For a specific implementation, refer to S403. Details are not described herein again.

Optionally, if the LMF network element needs to send an instruction related to location information of the terminal device to the terminal device, for example, an auto-driving instruction, a navigation instruction, or an IIoT operation instruction, the LMF network element may further deliver the location information of the terminal device to the terminal device along with the instruction. That is, S509 may be further performed in the positioning method shown in FIG. 5.

S509: The LMF network element sends the location information of the terminal device to the terminal device. Correspondingly, the terminal device receives the location information of the terminal device from the LMF network element.

Optionally, the LMF network element may send the location information of the terminal device to the terminal device via the AMF network element and the SgNB. Correspondingly, the terminal device may receive the location information of the terminal device from the LMF network element via the SgNB and the AMF network element.

For a specific implementation, refer to S404. Details are not described herein again.

It should be noted that, as shown in FIG. 5, the SgNB and/or the one or more NgNBs may also be collectively referred to as a positioning measurement network element, and the LMF network element and the AMF network element may also be integrated into one network element, namely, a positioning management network element. Implementations of the foregoing network elements are not specifically limited in this embodiment of this application.

For example, FIG. 6 is a schematic flowchart 3 of a positioning method according to an embodiment of this application. The positioning method is applicable to communication between the LMF network element and the terminal device that are shown in FIG. 2. The LMF network element is a positioning management network element, the terminal device is a positioning measurement network element and a to-be-positioned terminal device.

As shown in FIG. 6, the positioning method includes the following steps.

S601: The LMF network element sends a DL-CSI measurement capability information request (RequestCapabilities) to the terminal device. Correspondingly, the terminal device receives the DL-CSI measurement capability information request from the LMF network element.

The DL-CSI measurement capability information request is used to request the terminal device to report DL-CSI measurement capability information of the terminal device, so that the LMF network element customizes a DL-CSI measurement task for the terminal device based on a DL-CSI measurement capability of the terminal device, to avoid invalid signaling exchange caused by delivery of a DL-CSI measurement task exceeding the DL-CSI measurement capability of the terminal device to the terminal device, so that positioning efficiency is improved.

Optionally, the DL-CSI measurement capability information request may be sent by using an LTE positioning protocol (LTE positioning protocol, LPP) message. For a specific implementation of the LPP message, refer to an existing technology. Details are not described in this embodiment of this application.

Optionally, the LMF network element may send the DL-CSI measurement capability information request to the terminal device via the AMF network element and the SgNB. Correspondingly, the terminal device may receive the DL-CSI measurement capability information request from the LMF network element via the SgNB and the AMF network element.

S602: The terminal device sends a DL-CSI measurement capability information response (ProvideCapabilities) to the LMF network element. Correspondingly, the LMF network element receives the DL-CSI measurement capability information response from the terminal device.

The DL-CSI measurement capability information response includes DL-CSI measurement capability information of the terminal device.

Specifically, the terminal device may send the DL-CSI measurement capability information of the terminal device to the LMF network element by using an LPP message.

Optionally, the terminal device may send the DL-CSI measurement capability information response to the LMF network element via the SgNB and the AMF network element. Correspondingly, the LMF network element may receive the DL-CSI measurement capability information response from the terminal device via the AMF network element and the SgNB.

S603: The terminal device sends a DL-CSI measurement assistance information request to the LMF network element. Correspondingly, the LMF network element receives the DL-CSI measurement assistance information request from the terminal device.

The DL-CSI measurement assistance information request is used to request the LMF network element to provide DL-CSI measurement assistance information, for example, configuration information of an access network element that sends a downlink reference signal to the terminal device, for example, an SgNB, and/or one or more NgNBs.

Specifically, the terminal device may send the DL-CSI measurement assistance information request to the LMF network element by using an LPP message.

Optionally, the terminal device may send the DL-CSI measurement assistance information request to the LMF network element via the SgNB and the AMF network element. Correspondingly, the LMF network element may receive the DL-CSI measurement assistance information request from the terminal device via the AMF network element and the SgNB.

S604: The LMF network element sends a DL-CSI measurement assistance information response to the terminal device. Correspondingly, the terminal device receives the DL-CSI measurement assistance information response from the LMF network element.

The DL-CSI measurement assistance information response includes the DL-CSI measurement assistance information.

Specifically, the LMF network element may send the DL-CSI measurement assistance information response to the terminal device by using an LPP message.

Optionally, the LMF network element may send the DL-CSI measurement assistance information response to the terminal device via the AMF network element and the SgNB. Correspondingly, the terminal device may receive the DL-CSI measurement assistance information response from the LMF network element via the SgNB and the AMF network element.

For specific implementations of S601 to S604, refer to the existing technology. Details are not described in this embodiment of this application.

After S601 to S604 are completed, that is, handshake (handshake) between the LMF network element and the terminal device is completed, the LMF network element may send a DL-CSI measurement request to the terminal device, that is, perform S605.

S605: The LMF network element sends the DL-CSI measurement request to the terminal device. Correspondingly, the terminal device receives the DL-CSI measurement request from the LMF network element.

For specific content of the DL-CSI measurement request, refer to the content of the positioning measurement request in S401. Details are not described herein again.

Specifically, the LMF network element may send the DL-CSI measurement request to the terminal device by using an LPP message.

Optionally, the LMF network element may send the DL-CSI measurement request to the terminal device via the AMF network element and the SgNB. Correspondingly, the terminal device may receive the DL-CSI measurement request from the LMF network element via the SgNB and the AMF network element.

Optionally, the DL-CSI measurement request may further include configuration information of a PRS or a CSI-RS, for example, a PRS sequence index, configuration information of a time domain resource and frequency domain resource for receiving the PRS by the terminal device, a CSI-RS sequence index, or configuration information of a time domain resource and frequency domain resource for receiving the PRS by the terminal device, so that the terminal device receives and measures DL-CSI corresponding to the PRS or the CSI-RS.

It should be noted that the LMF network element may further send the configuration information of the PRS or the CSI-RS to the access network element via the AMF network element. Correspondingly, the access network element receives the configuration information of the PRS or the CSI-RS from the LMF network element via the AMF network element, and sends the PRS signal or the CSI-RS to the terminal device based on the configuration information. The access network element that sends the PRS signal or the CSI-RS may include the SgNB and/or one or more NgNBs.

S606: The terminal device sends a DL-CSI measurement response to the LMF network element. Correspondingly, the LMF network element receives the DL-CSI measurement response from the terminal device.

For specific content of the DL-CSI measurement response, refer to the content of the positioning measurement response in Table 2 and Table 3 in S402. Details are not described herein again.

Specifically, the terminal device may send the DL-CSI measurement response to the LMF network element by using an LPP message.

Optionally, the terminal device may send the UL-CSI measurement response to the LMF network element via the SgNB and the AMF network element. Correspondingly, the LMF network element receives the DL-CSI measurement response from the terminal device via the AMF network element and the SgNB.

S607: The LMF network element determines a location of the terminal device based on DL-CSI.

For a specific implementation, refer to S403. Details are not described herein again.

Optionally, if the LMF network element needs to send an instruction related to location information of the terminal device to the terminal device, for example, an auto-driving instruction, a navigation instruction, or an IIoT operation instruction, the LMF network element may further deliver the location information of the terminal device to the terminal device along with the instruction. That is, S608 may be further performed in the positioning method shown in FIG. 6.

S608: The LMF network element sends the location information of the terminal device to the terminal device. Correspondingly, the terminal device receives the location information of the terminal device from the LMF network element.

For a specific implementation, refer to S404 or S509. Details are not described herein again.

It should be noted that, as shown in FIG. 6, the SgNB and/or the one or more NgNBs may also be collectively referred to as an access network element or a reference node, and the LMF network element and the AMF network element may also be integrated into one network element, namely, a positioning management network element. This is not specifically limited in this embodiment of this application.

It should be noted that, if the communication system shown in FIG. 1 is an LTE system, the positioning management network element shown in FIG. 1 may be an E-SMLC. For UL-CSI, the positioning measurement network element may be an evolved NodeB (evolved NodeB, eNB), such as a serving eNB and/or a neighbor eNB. For DL-CSI, the positioning measurement network element may be a terminal device. Optionally, the E-SMLC and a mobility management entity (mobility management entity, MME) may alternatively be integrated into a network element. Implementations of the foregoing network elements are not specifically limited in embodiments of this application.

Based on the positioning method shown in any one of FIG. 4, FIG. 5, or FIG. 6, the positioning management network element may determine the location of the terminal device based on the channel state information of the terminal device. Therefore, in a closed wireless communication environment such as an industrial internet of things, time of arrival and an angle of arrival of a detected radio signal are inaccurate due to a severe multi-path propagation phenomenon. Consequently, a positioning result of the terminal device is inaccurate. Positioning accuracy of the terminal device can be improved.

The positioning method provided in embodiments of this application is described in detail above with reference to FIG. 4 to FIG. 6. Other two types of positioning apparatuses provided in embodiments of this application are described in detail below with reference to FIG. 7 and FIG. 8.

Figure 7:
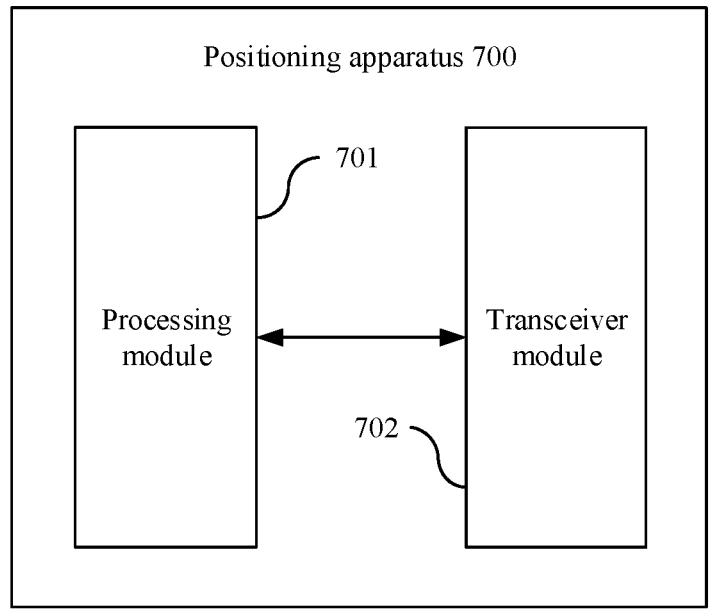
FIG. 7 is a schematic diagram 2 of a structure of a positioning apparatus according to an embodiment of this application.

For example, FIG. 7 is a schematic diagram 2 of a structure of a positioning apparatus according to an embodiment of this application. As shown in FIG. 7, the positioning apparatus 700 includes a processing module 701 and a transceiver module 702. For ease of description, FIG. 7 shows only main components of the positioning apparatus 700.

In a possible design solution, the positioning apparatus 700 may be applied to the communication system shown in FIG. 1 or FIG. 2, and perform a function of the positioning management network element in the positioning method shown in FIG. 4, or a function of the LMF network element in the positioning method shown in FIG. 5 or FIG. 6.

The transceiver module 702 is configured to send a positioning measurement request to a positioning measurement network element. The positioning measurement request is used to request the positioning measurement network element to feed back channel state information of a terminal device.

The transceiver module 702 is further configured to receive a positioning measurement response from the positioning measurement network element. The positioning measurement response includes the channel state information of the terminal device.

The processing module 701 is configured to determine a location of the terminal device based on the channel state information of the terminal device.

In a possible design solution, the channel state information of the terminal device may be distinguished in time domain or frequency domain. To be specific, the channel state information of the terminal device may include time domain channel state information or frequency domain channel state information. The positioning measurement request may include one or more of the following information: reference signal configuration information, domain configuration information, antenna port pair configuration information, time domain information, or frequency domain information. The reference signal configuration information is used to indicate configuration information of a reference signal used during channel state measurement. The domain configuration information is used to indicate to report the time domain channel state information or the frequency domain channel state information. The antenna port pair configuration information is used to indicate an antenna port pair whose channel state needs to be reported. The time domain information is used to indicate a time domain parameter used during channel state measurement. The frequency domain information is used to indicate a frequency domain parameter used during channel state measurement.

Optionally, the time domain information may include one or more of the following information: a total quantity of paths to be reported, a path power threshold, or a path amplitude threshold.

Optionally, the frequency domain information may include one or more of the following information: a frequency-domain range to be reported, a subcarrier spacing, or a radio bearer RB spacing.

Corresponding to the positioning measurement request, the positioning measurement response may include one or more of the following information: domain indication information, antenna port pair indication information, the time domain channel state information, or the frequency domain channel state information. The domain indication information is used to indicate that the channel state information of the terminal device is the time domain channel state information or the frequency domain channel state information. The antenna port pair indication information is used to indicate an antenna port pair corresponding to the channel state information of the terminal device.

Optionally, the time domain channel state information may include one or more of the following information: a total quantity of reported paths, a delay of each of the reported paths, amplitude of each of the reported paths, power of each of the reported paths, or a phase of each of the reported paths.

Optionally, the frequency domain channel state information may include one or more of the following information: a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs.

In another possible design solution, the channel state information of the terminal device may alternatively be distinguished based on a signal transmission direction. To be specific, the channel state information of the terminal device may include uplink channel state information UL-CSI of the terminal device and downlink channel state information DL-CSI of the terminal device.

It should be understood that the positioning apparatus 700 may control the transceiver module 702 to receive the UL-CSI or the DL-CSI of the terminal device from different positioning measurement network elements. Details are described below.

Optionally, the positioning measurement network element may include a serving access network element of the terminal device and/or a neighbor access network element of the serving access network element. Correspondingly, the channel state information of the terminal device may include the UL-CSI of the terminal device, and the positioning measurement request is used to request the serving access network element of the terminal device and/or the neighbor access network element of the serving access network element to feed back the UL-CSI of the terminal device.

Optionally, the foregoing reference signal configuration information may include one or more of the following information: a time domain configuration, a frequency domain configuration, a port number, or beam information of a sounding reference signal SRS.

Optionally, the positioning measurement network element may alternatively be the terminal device, the channel state information of the terminal device may include the downlink channel state information DL-CSI of the terminal device, and the positioning measurement request is used to request the DL-CSI of the terminal device.

Optionally, the positioning measurement request may be determined by the processing module 701 based on DL-CSI measurement capability information of the terminal device.

Further, the transceiver module 702 is further configured to receive the DL-CSI measurement capability information of the terminal device before the transceiver module 702 sends the positioning measurement request to the positioning measurement network element.

Optionally, the positioning measurement request may further include one or more of the following information: configuration information of the serving access network element of the terminal device or configuration information of the neighbor access network element of the serving access network element, for example, neighbor cell configuration information, base station identifiers, cell identifiers, or location information of the foregoing access network elements.

Optionally, the reference signal configuration information may include configuration information of a downlink reference signal, and the downlink reference signal may be a positioning reference signal PRS or a channel state information reference signal CSI-RS.

In a possible design solution, the processing module 701 is further configured to determine a location of the terminal device based on a correspondence between the channel state information of the terminal device and location information.

Optionally, the positioning apparatus 700 may further include a storage module (not shown in FIG. 7). The storage module stores a program or instructions. When the processing module 701 executes the program or the instructions, the positioning apparatus 700 is enabled to perform the positioning method shown in any one of FIG. 4 to FIG. 6.

It should be noted that the positioning apparatus 700 may be a positioning management network element, for example, an LMF network element, an E-SMLC, a positioning server, or a navigation server, or may be a chip (system) that may be disposed in the foregoing positioning management network element or another component that has a function of the positioning management network element. This is not specifically limited in this embodiment of this application.

In addition, for technical effects of the positioning apparatus 700, refer to the technical effects of the positioning method shown in any one of FIG. 4 to FIG. 6. Details are not described herein again.

Figure 8:
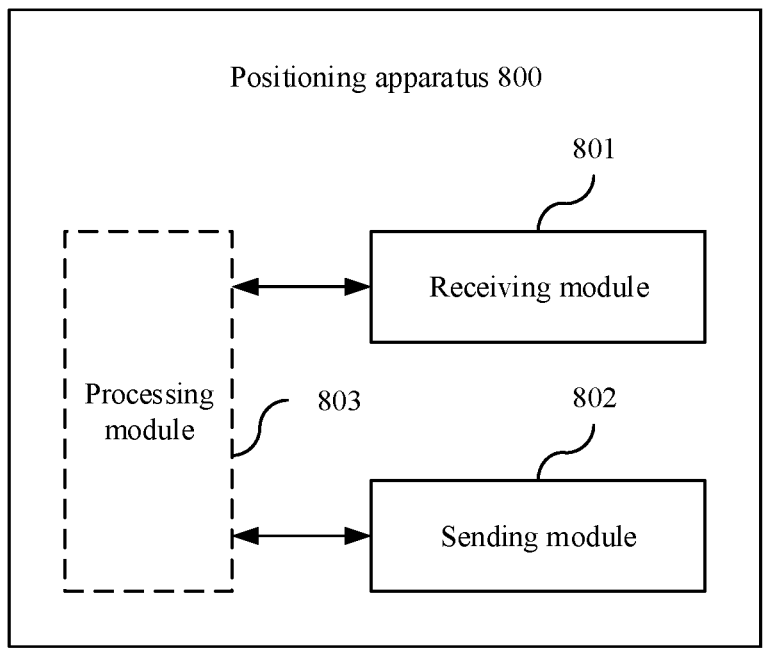
FIG. 8 is a schematic diagram 3 of a structure of a positioning apparatus according to an embodiment of this application.

For example, FIG. 8 is a schematic diagram 3 of a structure of a positioning apparatus according to an embodiment of this application. As shown in FIG. 8, the positioning apparatus 800 includes a receiving module 801 and a sending module 802. For ease of description, FIG. 8 shows only main components of the positioning apparatus 800.

In a possible design solution, the positioning apparatus 800 may be applied to the communication system shown in FIG. 1 or FIG. 2, and perform a function of the positioning measurement network element in the positioning method shown in FIG. 4, or a function of the access network element such as the SgNB or the NgNB in the positioning method shown in FIG. 5. Details are described below.

The receiving module 801 is configured to receive a positioning measurement request from a positioning management network element. The positioning measurement request is used to request the positioning apparatus 800 to feed back channel state information of a terminal device.

The sending module 802 is configured to send a positioning measurement response to the positioning management network element. The positioning measurement response includes the channel state information of the terminal device, and the channel state information of the terminal device is used by the positioning management network element to determine a location of the terminal device.

In a possible design solution, the channel state information of the terminal device may be distinguished in time domain or frequency domain. To be specific, the channel state information of the terminal device may include time domain channel state information or frequency domain channel state information. The positioning measurement request may include one or more of the following information: reference signal configuration information, domain configuration information, antenna port pair configuration information, time domain information, or frequency domain information. The reference signal configuration information is used to indicate configuration information of a reference signal used during channel state measurement. The domain configuration information is used to indicate to report the time domain channel state information or the frequency domain channel state information. The antenna port pair configuration information is used to indicate an antenna port pair whose channel state needs to be reported. The time domain information is used to indicate a time domain parameter used during channel state measurement. The frequency domain information is used to indicate a frequency domain parameter used during channel state measurement.

Optionally, the time domain information may include one or more of the following information: a total quantity of paths to be reported, a path power threshold, or a path amplitude threshold.

Optionally, the frequency domain information may include one or more of the following information: a frequency-domain range to be reported, a subcarrier spacing, or a radio bearer RB spacing.

Corresponding to the positioning measurement request, the positioning measurement response may include one or more of the following information: domain indication information, antenna port pair indication information, the time domain channel state information, or the frequency domain channel state information. The domain indication information is used to indicate that the channel state information of the terminal device is the time domain channel state information or the frequency domain channel state information. The antenna port pair indication information is used to indicate an antenna port pair corresponding to the channel state information of the terminal device.

Optionally, the time domain channel state information may include one or more of the following information: a total quantity of reported paths, a delay of each of the reported paths, amplitude of each of the reported paths, power of each of the reported paths, or a phase of each of the reported paths.

Optionally, the frequency domain channel state information may include one or more of the following information: a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs.

Optionally, the channel state information of the terminal device may include uplink channel state information UL-CSI of the terminal device, and the positioning measurement request is used to request the positioning apparatus 800 to feed back the UL-CSI of the terminal device.

Optionally, the reference signal configuration information may include one or more of the following information: a time domain configuration, a frequency domain configuration, a port number, or beam information of a sounding reference signal SRS.

Optionally, the positioning apparatus 800 may further include a processing module 803 (represented by a dashed-line box in FIG. 8) and a storage module (not shown in FIG. 8). The storage module stores a program or instructions. When the processing module 803 executes the program or the instructions, the positioning apparatus 800 is enabled to perform a function of the positioning measurement network element in the positioning method shown in FIG. 4, or a function of each access network element such as the SgNB or the NgNB in the positioning method shown in FIG. 5.

It should be noted that the positioning apparatus 800 may be an access network element, for example, a serving access network element of the terminal device or a neighbor access network element of the serving access network element, or may be a chip (system) that may be disposed in the foregoing access network element or another component that has a function of the access network element. This is not limited in this application.

In addition, for technical effects of the positioning apparatus 800, refer to the technical effects of the positioning method shown in FIG. 4 or FIG. 5. Details are not described herein again.

In another possible design solution, the positioning apparatus 800 may also be applied to the communication system shown in FIG. 1 or FIG. 2, and perform a function of the positioning measurement network element in the positioning method shown in FIG. 4, or a function of the terminal device in the positioning method shown in FIG. 6.

The receiving module 801 is configured to receive a positioning measurement request from a positioning management network element. The positioning measurement request is used to request the positioning apparatus 800 to feed back channel state information of the positioning apparatus 800.

The sending module 802 is configured to send a positioning measurement response to the positioning management network element. The positioning measurement response includes the channel state information of the positioning apparatus 800, and the channel state information of the positioning apparatus 800 is used by the positioning management network element to determine a location of the positioning apparatus 800.

In a possible design solution, the channel state information of the positioning apparatus 800 may be distinguished in time domain or frequency domain. To be specific, the channel state information of the positioning apparatus 800 may include time domain channel state information or frequency domain channel state information. The positioning measurement request may include one or more of the following information: reference signal configuration information, domain configuration information, antenna port pair configuration information, time domain information, or frequency domain information. The reference signal configuration information is used to indicate configuration information of a reference signal used during channel state measurement. The domain configuration information is used to indicate to report the time domain channel state information or the frequency domain channel state information. The antenna port pair configuration information is used to indicate an antenna port pair whose channel state needs to be reported. The time domain information is used to indicate a time domain parameter used during channel state measurement. The frequency domain information is used to indicate a frequency domain parameter used during channel state measurement.

Optionally, the time domain information may include one or more of the following information: a total quantity of paths to be reported, a path power threshold, or a path amplitude threshold.

Optionally, the frequency domain information may include one or more of the following information: a frequency-domain range to be reported, a subcarrier spacing, or a radio bearer RB spacing.

Corresponding to the positioning measurement request, the positioning measurement response may include one or more of the following information: domain indication information, antenna port pair indication information, the time domain channel state information, or the frequency domain channel state information. The domain indication information is used to indicate that the channel state information of the positioning apparatus 800 is the time domain channel state information or the frequency domain channel state information. The antenna port pair indication information is used to indicate an antenna port pair corresponding to the channel state information of the positioning apparatus 800.

Optionally, the time domain channel state information may include one or more of the following information: a total quantity of reported paths, a delay of each of the reported paths, amplitude of each of the reported paths, power of each of the reported paths, or a phase of each of the reported paths.

Optionally, the frequency domain channel state information may include one or more of the following information: a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs.

Optionally, the channel state information of the positioning apparatus 800 may include downlink channel state information DL-CSI of the positioning apparatus 800, and the positioning measurement request is used to request the DL-CSI of the positioning apparatus 800.

Optionally, the positioning measurement request may be determined by the positioning management network element based on DL-CSI measurement capability information of the positioning apparatus 800.

Further, the sending module 802 is further configured to: before the receiving module 801 receives the positioning measurement request from the positioning management network element, send the DL-CSI measurement capability information of the positioning apparatus 800 to the positioning management network element. The DL-CSI measurement capability information of the positioning apparatus 800 is used by the positioning management network element to determine the positioning measurement request.

Optionally, the positioning measurement request may further include one or more of the following information: configuration information of a serving access network element of the positioning apparatus 800 or configuration information of a neighbor access network element of the serving access network element, for example, neighbor cell configuration information, base station identifiers, cell identifiers, or location information of the foregoing access network elements.

Optionally, the reference signal configuration information may include configuration information of a downlink reference signal, and the downlink reference signal may be a positioning reference signal PRS or a channel state information reference signal CSI-RS.

Optionally, the positioning apparatus 800 may further include a processing module 803 (identified by a dashed-line box in FIG. 8) and a storage module (not shown in FIG. 8). The storage module stores a program or instructions. When the processing module 803 executes the program or the instructions, the positioning apparatus 800 is enabled to perform the positioning method shown in FIG. 4 or FIG. 6.

It should be noted that the positioning apparatus 800 may be a terminal device, for example, an IIoT terminal, an internet of things terminal, a mobile phone, or a vehicle-mounted terminal, or may be a chip (system) that may be disposed in the foregoing terminal device or another component that has a function of the terminal device. This is not limited in this application.

In addition, for technical effects of the positioning apparatus 800, refer to the technical effects of the positioning method shown in FIG. 4 or FIG. 6. Details are not described herein again.

An embodiment of this application provides a chip system. The chip system includes a processor and an input/output port. The processor is configured to implement a processing function in the foregoing method embodiments, and the input/output port is configured to implement a transceiver function in the foregoing method embodiments.

In a possible design, the chip system further includes a memory. The memory is configured to store program instructions and data for implementing a function in the foregoing method embodiments.

The chip system may include a chip, or may include the chip and another discrete component.

An embodiment of this application provides a communication system that can be configured to locate a terminal device. The communication system includes a to-be-positioned terminal device, a positioning management network element, and a positioning measurement network element. The positioning management network element may be an LMF network element, an E-SMLC, a positioning server, a navigation server, or the like. The positioning measurement network element may include the terminal device, an access network element, or the like. The access network element may include a serving access network element of the terminal device, for example, an SgNB, and/or a neighbor access network element of the serving access network element, for example, an NgNB. For examples of the terminal device and the access network element, refer to the foregoing embodiments of the communication system. Details are not described herein again.

An embodiment of this application provides a computer-readable storage medium, including a computer program or instructions. When the computer program or the instructions are run on a computer, the computer is enabled to perform the positioning method in the foregoing method embodiments.

An embodiment of this application provides a computer program product, including a computer program or instructions. When the computer program or instructions are run on a computer, the computer is enabled to perform the positioning method in the foregoing method embodiments.

It should be understood that, the processor in embodiments of this application may be a central processing unit (central processing unit, CPU), or the processor may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate, a transistor logic device, a discrete hardware component, or the like. The general-purpose processor may be a microprocessor, or the processor may be any conventional processor or the like.

It may be further understood that the memory in embodiments of this application may be a volatile memory or a non-volatile memory, or may include both the volatile memory and the non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), which is used as an external cache. Through example but not limitative descriptions, many forms of random access memories (random access memories, RAMs) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When the software is used to implement the embodiments, all or some of the foregoing embodiments may be implemented in a form of a computer program product. The computer program product includes one or more computer instructions or computer programs. When the computer instructions or the computer programs are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and indicates that three relationships may exist. For example, A and/or B may indicate the following three cases: only A exists, both A and B exist, and only B exists. A and B may be singular or plural. In addition, the character "/" in this specification usually represents an "or" relationship between the associated objects, or may indicate an "and/or" relationship. A specific meaning depends on a context.

In this application, "at least one" means one or more, and "a plurality of" means two or more. "At least one item (piece) of the following" or a similar expression thereof means any combination of these items, including a singular item (piece) or any combination of plural items (pieces). For example, at least one (piece) of a, b, or c may represent: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by using electronic hardware or a combination of computer software and the electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the existing technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A positioning apparatus, comprising:
at least one processor;
a transceiver; and
one or more memories coupled to the at least one processor and storing programming instructions for execution by the at least one processor to:
send, by the transceiver, a positioning measurement request to a positioning measurement network element, wherein the positioning measurement request is used to request the positioning measurement network element to feed back channel state information of a terminal device, wherein the positioning measurement request comprises antenna port pair configuration information that indicates an antenna port pair whose channel state needs to be reported;
receive, by the transceiver, a positioning measurement response from the positioning measurement network element, wherein the positioning measurement response comprises the channel state information of the terminal device, and the positioning measurement response comprises antenna port pair indication information that indicates the antenna port pair corresponding to the channel state information of the terminal device; and
determine a location of the terminal device based on the channel state information of the terminal device.

2. The positioning apparatus according to claim 1, wherein the channel state information of the terminal device comprises time domain channel state information or frequency domain channel state information, and wherein the positioning measurement request comprises one or more of the following information:
reference signal configuration information, wherein the reference signal configuration information indicates configuration information of a reference signal used during channel state measurement;
domain configuration information, wherein the domain configuration information indicates to report the time domain channel state information or the frequency domain channel state information;
time domain information, wherein the time domain information indicates a time domain parameter used during channel state measurement; or
frequency domain information, wherein the frequency domain information indicates a frequency domain parameter used during channel state measurement.

3. The positioning apparatus according to claim 2, wherein the time domain information comprises at least one of a total quantity of paths to be reported, a path power threshold, or a path amplitude threshold, and wherein the frequency domain information comprises at least one of a frequency-domain range to be reported, a subcarrier spacing, or a radio bearer resource block (RB) spacing.

4. The positioning apparatus according to claim 2, wherein the positioning measurement response comprises one or more of the following information:
domain indication information, wherein the domain indication information indicates that the channel state information of the terminal device is the time domain channel state information or the frequency domain channel state information;
or
the time domain channel state information and the frequency domain channel state information.

5. The positioning apparatus according to claim 4, wherein the time domain channel state information comprises at least one of a total quantity of reported paths, a delay of each of the reported paths, amplitude of each of the reported paths, power of each of the reported paths, or a phase of each of the reported paths.

6. The positioning apparatus according to claim 4, wherein the frequency domain channel state information comprises at least one of a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs.

7. The positioning apparatus according to claim 1, wherein the positioning measurement network element comprises at least one of a serving access network element of the terminal device or a neighbor access network element of the serving access network element, the channel state information of the terminal device comprises uplink channel state information (UL-CSI) of the terminal device, and the positioning measurement request is used to request the at least one of the serving access network element of the terminal device or the neighbor access network element of the serving access network element to feed back the UL-CSI of the terminal device.

8. The positioning apparatus according to claim 1, wherein the positioning measurement network element is the terminal device, the channel state information of the terminal device comprises downlink channel state information (DL-CSI) of the terminal device, and the positioning measurement request is used to request the DL-CSI of the terminal device.

9. A positioning apparatus, comprising:
at least one processor;
a transceiver; and
one or more memories coupled to the at least one processor and storing programming instructions for execution by the at least one processor to:
receive, by the transceiver, a positioning measurement request from a positioning management network element, wherein the positioning measurement request is used to request the positioning apparatus to feed back channel state information of a terminal device, wherein the positioning measurement request comprises antenna port pair configuration information that indicates an antenna port pair whose channel state needs to be reported; and send, by the transceiver, a positioning measurement response to the positioning management network element, wherein the positioning measurement response comprises the channel state information of the terminal device, and the positioning measurement response comprises antenna port pair indication information that indicates the antenna port pair corresponding to the channel state information of the terminal device, wherein the channel state information of the terminal device is used by the positioning management network element to determine a location of the terminal device.

10. The positioning apparatus according to claim 9, wherein the channel state information of the terminal device comprises time domain channel state information or frequency domain channel state information, and wherein the positioning measurement request comprises one or more of the following information:
reference signal configuration information, wherein the reference signal configuration information indicates configuration information of a reference signal used during channel state measurement;
domain configuration information, wherein the domain configuration information indicates to report the time domain channel state information or the frequency domain channel state information;
time domain information, wherein the time domain information indicates a time domain parameter used during channel state measurement; or
frequency domain information, wherein the frequency domain information indicates a frequency domain parameter used during channel state measurement.

11. The positioning apparatus according to claim 10, wherein the time domain information comprises at least one of a total quantity of paths to be reported, a path power threshold, or a path amplitude threshold, and wherein the frequency domain information comprises at least one of a frequency-domain range to be reported, a subcarrier spacing, or a radio bearer resource block (RB) spacing.

12. The positioning apparatus according to claim 10, wherein the positioning measurement response comprises one or more of the following information:
domain indication information, wherein the domain indication information indicates that the channel state information of the terminal device is the time domain channel state information or the frequency domain channel state information;
or
the time domain channel state information and the frequency domain channel state information.

13. The positioning apparatus according to claim 12, wherein the time domain channel state information comprises at least one of a total quantity of reported paths, a delay of each of the reported paths, amplitude of each of the reported paths, power of each of the reported paths, or a phase of each of the reported paths.

14. The positioning apparatus according to claim 12, wherein the frequency domain channel state information comprises at least one of a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs.

15. The positioning apparatus according to claim 9, wherein the channel state information of the terminal device comprises at least one of uplink channel state information (UL-CSI) of the terminal device, and the positioning measurement request is used to request the positioning apparatus to feed back the UL-CSI of the terminal device.

16. A positioning apparatus, comprising:
at least one processor;
a transceiver; and
one or more memories coupled to the at least one processor and storing programming instructions for execution by the at least one processor to:
receive, by the transceiver, a positioning measurement request from a positioning management network element, wherein the positioning measurement request is used to request the positioning apparatus to feed back channel state information of the positioning apparatus, wherein the positioning measurement request comprises antenna port pair configuration information that indicates an antenna port pair whose channel state needs to be reported; and
send, by the transceiver, a positioning measurement response to the positioning management network element, wherein the positioning measurement response comprises the channel state information of the positioning apparatus, and the positioning measurement response comprises antenna port pair indication information that indicates the antenna port pair corresponding to the channel state information of the positioning apparatus, wherein the channel state information of the positioning apparatus is used by the positioning management network element to determine a location of the positioning apparatus.

17. The positioning apparatus according to claim 16, wherein the channel state information of the positioning apparatus comprises time domain channel state information or frequency domain channel state information, and wherein the positioning measurement request comprises one or more of the following information:
reference signal configuration information, wherein the reference signal configuration information indicates configuration information of a reference signal used during channel state measurement;
domain configuration information, wherein the domain configuration information indicates to report the time domain channel state information or the frequency domain channel state information;
time domain information, wherein the time domain information indicates a time domain parameter used during channel state measurement; or
frequency domain information, wherein the frequency domain information indicates a frequency domain parameter used during channel state measurement.

18. The positioning apparatus according to claim 17, wherein the time domain information comprises at least one of a total quantity of paths to be reported, a path power threshold, or a path amplitude threshold, and wherein the frequency domain information comprises at least one of a frequency-domain range to be reported, a subcarrier spacing, or a radio bearer resource block (RB) spacing.

19. The positioning apparatus according to claim 17, wherein the positioning measurement response comprises one or more of the following information:
domain indication information, wherein the domain indication information indicates that the channel state information of the positioning apparatus is the time domain channel state information or the frequency domain channel state information;

or
  the time domain channel state information and the frequency domain channel state information.

20. The positioning apparatus according to claim 19, wherein the time domain channel state information comprises at least one of a total quantity of reported paths, a delay of each of the reported paths, amplitude of each of the reported paths, power of each of the reported paths, or a phase of each of the reported paths.

21. The positioning apparatus according to claim 19, wherein the frequency domain channel state information comprises at least one of a quantity of reported subcarriers, amplitude of each of the reported subcarriers, power of each of the reported subcarriers, a phase of each of the reported subcarriers, a quantity of reported radio bearer RBs, amplitude of each of the reported RBs, power of each of the reported RBs, or a phase of each of the reported RBs.

22. The positioning apparatus according claim 16, wherein the channel state information of the positioning apparatus comprises downlink channel state information (DL-CSI) of the positioning apparatus, and the positioning measurement request is used to request the DL-CSI of the positioning apparatus.

\* \* \* \* \*